(12) United States Patent
Miura

(10) Patent No.: US 10,217,035 B2
(45) Date of Patent: Feb. 26, 2019

(54) IC TAG ISSUING APPARATUS

(71) Applicant: SATO HOLDINGS KABUSHIKI KAISHA, Tokyo (JP)

(72) Inventor: Kuniyuki Miura, Saitama (JP)

(73) Assignee: SATO HOLDINGS KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/129,581

(22) PCT Filed: Jul. 28, 2014

(86) PCT No.: PCT/JP2014/069838
§ 371 (c)(1),
(2) Date: Sep. 27, 2016

(87) PCT Pub. No.: WO2015/151305
PCT Pub. Date: Oct. 8, 2015

(65) Prior Publication Data
US 2017/0213113 A1    Jul. 27, 2017

(30) Foreign Application Priority Data
Mar. 31, 2014   (JP) ................. 2014-071351

(51) Int. Cl.
*G06K 7/08*      (2006.01)
*G06K 19/06*     (2006.01)
(Continued)

(52) U.S. Cl.
CPC ........... *G06K 13/073* (2013.01); *G06K 1/121* (2013.01); *G06K 19/077* (2013.01)

(58) Field of Classification Search
USPC ........................................ 235/451, 492, 375
See application file for complete search history.

(56) References Cited

U.S. PATENT DOCUMENTS 4,944,827 A * 7/1990 Lilly ..................... B65C 9/46
                                                    101/288
8,063,783 B2 * 11/2011 Miyashita ............. B65H 37/04
                                                    235/380
(Continued)

FOREIGN PATENT DOCUMENTS

CN    1989511 A    6/2007
CN    101751584 A  6/2010
(Continued)

OTHER PUBLICATIONS

U.S. Appl. No. 15/300,047, filed Sep. 28, 2016, Sato Holdings Kabushiki Kaisha.
(Continued)

*Primary Examiner* — Tuyen K Vo
(74) *Attorney, Agent, or Firm* — Foley & Lardner LLP

(57) ABSTRACT

A first conveyance unit and a second conveyance unit functioning as pre-processing conveyance units provided in a pre-processing device and conveying the IC tag continuous body by suctioning it to conveyance belts, a second tractor feeder unit functioning as a print-processing tractor feeder unit provided in a printing device and conveying the IC tag continuous body by engaging and disengaging feed pins in sprocket holes formed in the IC tag continuous body, and a fourth conveyance unit functioning as a post-processing conveyance unit provided in a post-processing device and conveying the IC tag continuous body by suctioning it to a conveyance belt are provided.

31 Claims, 15 Drawing Sheets

(51) Int. Cl.
*G06K 13/073* (2006.01)
*G06K 1/12* (2006.01)
*G06K 19/077* (2006.01)

(56) References Cited

U.S. PATENT DOCUMENTS

| | | | |
|---|---|---|---|
| 8,925,819 B2 | 1/2015 | Shidara et al. | |
| 9,199,487 B2 * | 12/2015 | Maeda | B41J 11/006 |
| 2006/0028526 A1 * | 2/2006 | Nakashima | B41J 11/007 |
| | | | 347/104 |
| 2006/0049253 A1 * | 3/2006 | Butler | G06F 3/1209 |
| | | | 235/432 |
| 2006/0237536 A1 * | 10/2006 | Shiigi | G06K 7/10336 |
| | | | 235/439 |
| 2007/0216525 A1 * | 9/2007 | Toshiaki | G06K 5/02 |
| | | | 340/500 |
| 2007/0252700 A1 * | 11/2007 | Ishihara | B65C 9/188 |
| | | | 340/572.7 |
| 2008/0047760 A1 * | 2/2008 | Georgitsis | G01G 11/04 |
| | | | 177/1 |
| 2008/0135625 A1 | 6/2008 | Waschk | |
| 2008/0231419 A1 | 9/2008 | Mizukawa et al. | |
| 2010/0156615 A1 * | 6/2010 | Ochiai | G06K 17/0006 |
| | | | 340/10.51 |
| 2010/0247871 A1 * | 9/2010 | Barczyk | B31D 1/021 |
| | | | 428/174 |
| 2011/0216146 A1 * | 9/2011 | Asahina | B41J 2/325 |
| | | | 347/197 |
| 2012/0193022 A1 * | 8/2012 | Yamasita | B65C 1/021 |
| | | | 156/249 |
| 2012/0249305 A1 | 10/2012 | Shidara et al. | |
| 2014/0205308 A1 * | 7/2014 | Kamoda | G03G 15/2021 |
| | | | 399/67 |

FOREIGN PATENT DOCUMENTS

| | | | |
|---|---|---|---|
| CN | 102129587 A | 7/2011 | |
| CN | 201965641 U | 9/2011 | |
| CN | 102737266 A | 10/2012 | |
| EP | 2107510 A1 * | 10/2009 | B41J 3/407 |
| JP | 2006-338179 A | 12/2006 | |
| JP | 2010-005801 A | 1/2010 | |

OTHER PUBLICATIONS

Chinese Office Action, dated Jul. 25, 2018, 8 pages.
Chinese Office Action, dated Jun. 1, 2018, 7 pages.

* cited by examiner

| IDENTIFICATION DATA | | PRINT DATA | | | TAG ID |
|---|---|---|---|---|---|
| MANAGEMENT NUMBER | .... | PRODUCT NUMBER | PRODUCT NAME | .... | |
| A00001 | | W00001 | SHIRT | | |
| A00002 | | W00001 | SHIRT | | |
| A00003 | | W00001 | SHIRT | | |
| A00004 | | W00001 | SHIRT | | |
| A00005 | | W00001 | SHIRT | | |
| A00006 | | W00001 | SHIRT | | |
| A00007 | | W00001 | SHIRT | | |
| A00008 | | W00001 | SHIRT | | |
| A00009 | | W00001 | SHIRT | | |
| A00010 | | W00001 | SHIRT | | |
| A00011 | | W00101 | SWEATER | | |
| A00012 | | W00101 | SWEATER | | |
| A00013 | | W00101 | SWEATER | | |
| A00014 | | W00101 | SWEATER | | |
| A00015 | | W00101 | SWEATER | | |
| A00016 | | W00101 | SWEATER | | |
| A00017 | | W00101 | SWEATER | | |
| A00018 | | W00101 | SWEATER | | |
| A00019 | | W00101 | SWEATER | | |
| A00020 | | W00101 | SWEATER | | |
| A00021 | | W00101 | SWEATER | | |
| | | | SWEATER | | |

FIG.14A

| IDENTIFICATION DATA | | PRINT DATA | | | TAG ID |
| --- | --- | --- | --- | --- | --- |
| MANAGEMENT NUMBER | •••• | PRODUCT NUMBER | PRODUCT NAME | •••• | |
| A00001 | | W00001 | SHIRT | | 123123 |
| A00002 | | W00001 | SHIRT | | 123103 |
| A00003 | | W00001 | SHIRT | | 123223 |
| A00004 | | W00001 | SHIRT | | 120003 |
| A00005 | | W00001 | SHIRT | | |
| A00006 | | W00001 | SHIRT | | 126323 |
| A00007 | | W00001 | SHIRT | | 123753 |
| A00008 | | W00001 | SHIRT | | 123653 |
| A00009 | | W00001 | SHIRT | | 129663 |
| A00010 | | W00001 | SHIRT | | 123341 |
| A00011 | | W00101 | SWEATER | | 123368 |
| A00012 | | W00101 | SWEATER | | 126544 |
| A00013 | | W00101 | SWEATER | | 123651 |
| A00014 | | W00101 | SWEATER | | 111112 |
| A00015 | | W00101 | SWEATER | | 123795 |
| A00016 | | W00101 | SWEATER | | 126313 |
| A00017 | | W00101 | SWEATER | | 123424 |
| A00018 | | W00101 | SWEATER | | 122155 |
| A00019 | | W00101 | SWEATER | | 127632 |
| A00020 | | W00101 | SWEATER | | |
| A00021 | | W00101 | SWEATER | | |
| | | | SWEATER | | |

FIG.14B

| MATRIX INFORMATION | | TAG ID | IDENTIFICATION DATA | | PRINT DATA | | |
|---|---|---|---|---|---|---|---|
| LINE | ROW | | MANAGEMENT NUMBER | •••• | PRODUCT NUMBER | PRODUCT NAME | •••• |
| 1 | 1 | 123123 | A00001 | | W00001 | SHIRT | |
| 1 | 2 | 123103 | A00002 | | W00001 | SHIRT | |
| 1 | 3 | 123223 | A00003 | | W00001 | SHIRT | |
| 1 | 4 | 120003 | A00004 | | W00001 | SHIRT | |
| 1 | 5 | 120000 | A00005 | | W00001 | SHIRT | |
| 1 | 6 | 126323 | A00006 | | W00001 | SHIRT | |
| 1 | 7 | 123753 | A00007 | | W00001 | SHIRT | |
| 1 | 8 | 123653 | A00008 | | W00001 | SHIRT | |
| 1 | 9 | 129663 | A00009 | | W00001 | SHIRT | |
| 1 | 10 | 123341 | A00010 | | W00001 | SHIRT | |
| 2 | 1 | | | | | | |
| 2 | 2 | 123368 | A00011 | | W00101 | SWEATER | |
| 2 | 3 | 126544 | A00012 | | W00101 | SWEATER | |
| 2 | 4 | 123651 | A00013 | | W00101 | SWEATER | |
| 2 | 5 | 111112 | A00014 | | W00101 | SWEATER | |
| 2 | 6 | 123795 | A00015 | | W00101 | SWEATER | |
| 2 | 7 | 126313 | A00016 | | W00101 | SWEATER | |
| 2 | 8 | 123424 | A00017 | | W00101 | SWEATER | |
| 2 | 9 | 122155 | A00018 | | W00101 | SWEATER | |
| 2 | 10 | 127632 | A00019 | | W00101 | SWEATER | |

FIG.15A

| IDENTIFICATION DATA | | PRINT DATA | | |
|---|---|---|---|---|
| MANAGEMENT NUMBER | •••• | PRODUCT NUMBER | PRODUCT NAME | •••• |
| A00005 | | W00001 | SHIRT | |
| | | | | |
| | | | | |
| | | | | |
| | | | | |
| | | | | |
| | | | | |
| | | | | |

FIG.15B

IC TAG ISSUING APPARATUS

TECHNICAL FIELD

The present invention relates to an IC tag issuing apparatus writing desired identification data in each of IC tags of an IC tag continuous body on which the IC tags are aligned in multiple rows in a non-contact manner and issuing it.

BACKGROUND ART

Conventionally, technologies for facilitating inventory control, sales control and the like of merchandises by an RFID (radio frequency identification) using an IC tag having an IC chip and an antenna and making electric writing/reading of information in a non-contact manner possible has been proposed. The IC chip and the antenna are contained in a sheet such as a label, a price tag and the like as an inlay (inlet) formed on a film in general, and an IC tag is configured. The inlay itself including the IC chip and the antenna is also called an IC tag, an electronic tag, a wireless tag and an RFID tag in some cases but in this Description, a sheet such as a merchandise tag (price tag), a label and the like including the IC chip and the antenna is called an IC tag.

The IC tag is offered as an IC tag continuous body on which the IC tags are continuously aligned in general in many cases, and an IC tag issuing apparatus which writes desired data such as a product number in the IC tag continuous body in a non-contact manner and applies printing of data of the product or a producer or a barcode obtained by coding it or the like on a surface of each of them and issues the result is proposed (see Patent Literature 1, for example).

CITATION LIST

Patent Literature

Patent Literature 1: Japanese Patent Laid-Open No. 2006-338179

SUMMARY OF INVENTION

Problem to be Solved by Invention

Particularly in recent years, usage of the IC tags has increased, and needs for a large quantity of issuance of the IC tags at a high speed have heightened. In improvement of an issuing speed of the IC tag, the IC tag continuous body on which the IC tags are aligned in one row has limitation, and issuance using the IC tag continuous body on which the IC tags are aligned in multiple rows is in demand. If the IC tag continuous body on which the IC tags are aligned in multiple rows is used, a width of the IC tag continuous body becomes wider, and there is a problem that defective data writing, defective printing, and defective data reading caused by meandering, skewing or rising of the IC tag continuous body can easily occur.

That is, an IC tag can be easily broken when an external force is applied in a direction perpendicular to a sheet. An IC tag issuing apparatus generally has a long conveyance path including a pre-processing device for writing identification data such as a management number in the IC tags in multiple rows aligned as the IC tag continuous body, a printing device for printing print data on the IC tag in which the identification data has been written, and a post-processing device for reading and verifying the identification data written to the IC tag. In the IC tag issuing apparatus having such a long conveyance path, if the IC tag continuous body which can be easily broken when an external force is applied in the direction perpendicular to the sheet, it is difficult to convey the IC tag continuous body with an appropriate tension being given, and there is the problem that defective data writing, defective printing, and defective data reading caused by meandering, skewing or rising of the IC tag continuous body can easily occur.

An object of the present invention is to solve the problem of the prior-art technology as above and to provide an IC tag issuing apparatus capable of conveying the IC tag continuous body with an appropriate tension being given and of preventing defective data writing, defective printing, and defective data reading.

Solution to Problem

The present invention solves the problem by means for solving below. An IC tag issuing apparatus of the present invention is an IC tag issuing apparatus having a pre-processing device configured to write identification data to IC tags arranged in multiple rows aligned as an IC tag continuous body, a printing device configured to print print data on the IC tags to which the identification data has been written, and a post-processing device configured to read and verify the identification data written to the IC tags, the IC tag issuing apparatus comprising a pre-processing conveyance unit provided in the pre-processing device, the pre-processing conveyance unit being configured to convey the IC tag continuous body by suctioning the IC tag continuous body to a conveyance belt, a print-processing tractor feeder unit provided in the printing device, the print-processing tractor feeder unit being configured to convey the IC tag continuous body by engaging and disengaging feed pins in sprocket holes formed in the IC tag continuous body, and a post-processing conveyance unit provided in the post-processing device, the post-processing conveyance unit being configured to convey the IC tag continuous body by suctioning the IC tag continuous body to a conveyance belt. Moreover, in the IC tag issuing apparatus of the present invention, a conveyance speed of the pre-processing conveyance unit may be set slower than the conveyance speed of the print-processing tractor feeder unit, and the conveyance speed of the post-processing conveyance unit may be set faster than the conveyance speed of the print-processing tractor feeder unit. Moreover, in the IC tag issuing apparatus of the present invention, a pre-processing antenna unit arranged to face the pre-processing conveyance unit, the pre-processing antenna unit being configured to write the identification data to the IC tags, and a post-processing antenna unit arranged to face the post-processing conveyance unit, the post-processing antenna unit being configured to read the identification data written to the IC tags may be provided. Moreover, in the IC tag issuing apparatus of the present invention, a pre-processing tractor feeder unit provided on an upstream side from the pre-processing conveyance unit of the pre-processing device, the pre-processing tractor feeder unit being configured to convey the IC tag continuous body by engaging and disengaging the feed pins in the sprocket holes formed in the IC tag continuous body, and rotation angle detecting means provided on a driving shaft of the pre-processing tractor feeder unit may be provided, and the pre-processing tractor feeder unit stops driving before the IC tag continuous body reaches the print-processing tractor feeder unit after the IC tag continuous body is conveyed to the pre-processing conveyance unit. Moreover, in the IC tag issuing apparatus of the present invention, the conveyance belts of the pre-processing conveyance unit and the post-processing conveyance unit may be urethane belts, and support plates supporting the conveyance belts may be POM (polyacetal resin) plates.

Advantageous Effect of the Invention

According to the present invention, such effects are exerted that an appropriate tension can be given to the IC tag continuous body on which the IC tags are aligned in multiple rows, and defective data writing, defective printing, and defective data reading caused by meandering, skewing or rising of the IC tag continuous body can be prevented.

BRIEF DESCRIPTION OF DRAWINGS

FIGS. 14A and 14B are views illustrating a product information example stored in an information storage unit illustrated in FIG. 13.

FIGS. 15A and 15B are views illustrating a page information example and a reissuance information example stored in an information storage unit illustrated in FIG. 13.

DESCRIPTION OF EMBODIMENTS

Figure 1:
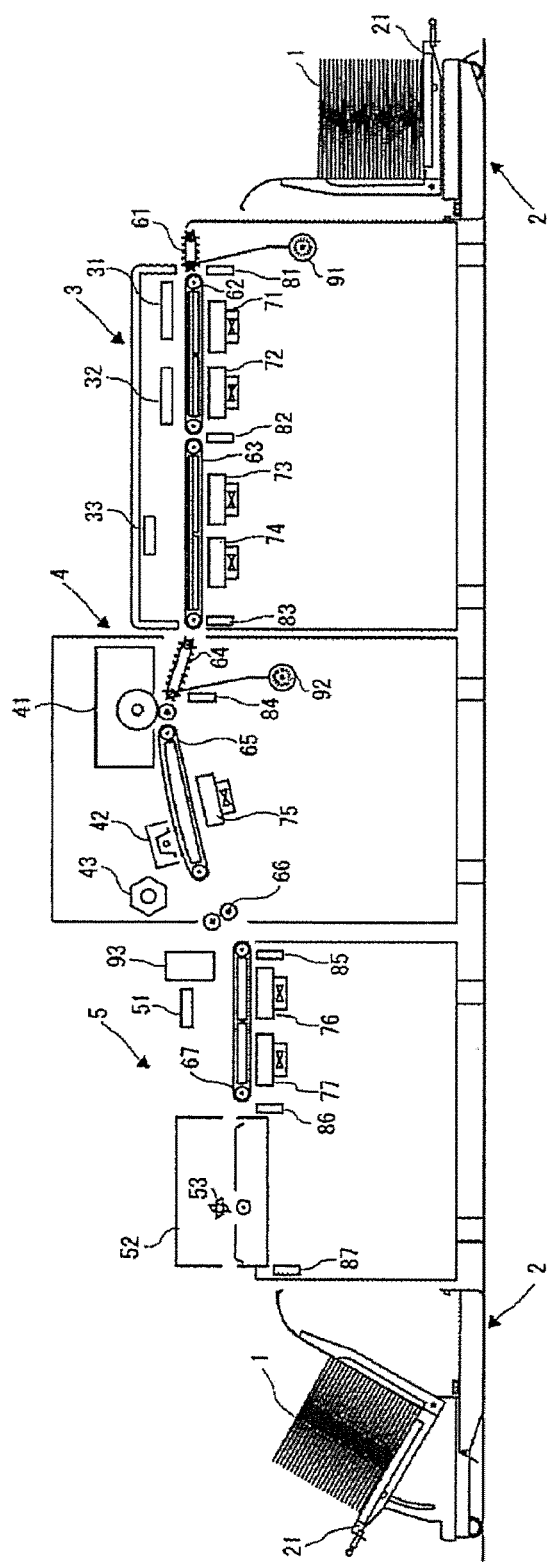
FIG. 1 is a schematic side view illustrating configuration of an embodiment of an IC tag issuing apparatus according to the present invention.

An IC tag issuing apparatus of this embodiment writes desired data in each of IC chips of an IC tag continuous body 1 in a non-contact manner and also applies printing of information of a product or a producer, a barcode obtained by coding it or the like on the respective surfaces and issues the result. The IC tag issuing apparatus includes a placing base 2 on which the IC tag continuous body 1 before issuance is placed, a pre-processing device 3, a printing device 4, a post-processing device 5, and the placing base 2 on which the issued IC tag continuous body 1 is placed by referring to FIG. 1.

Figure 2:
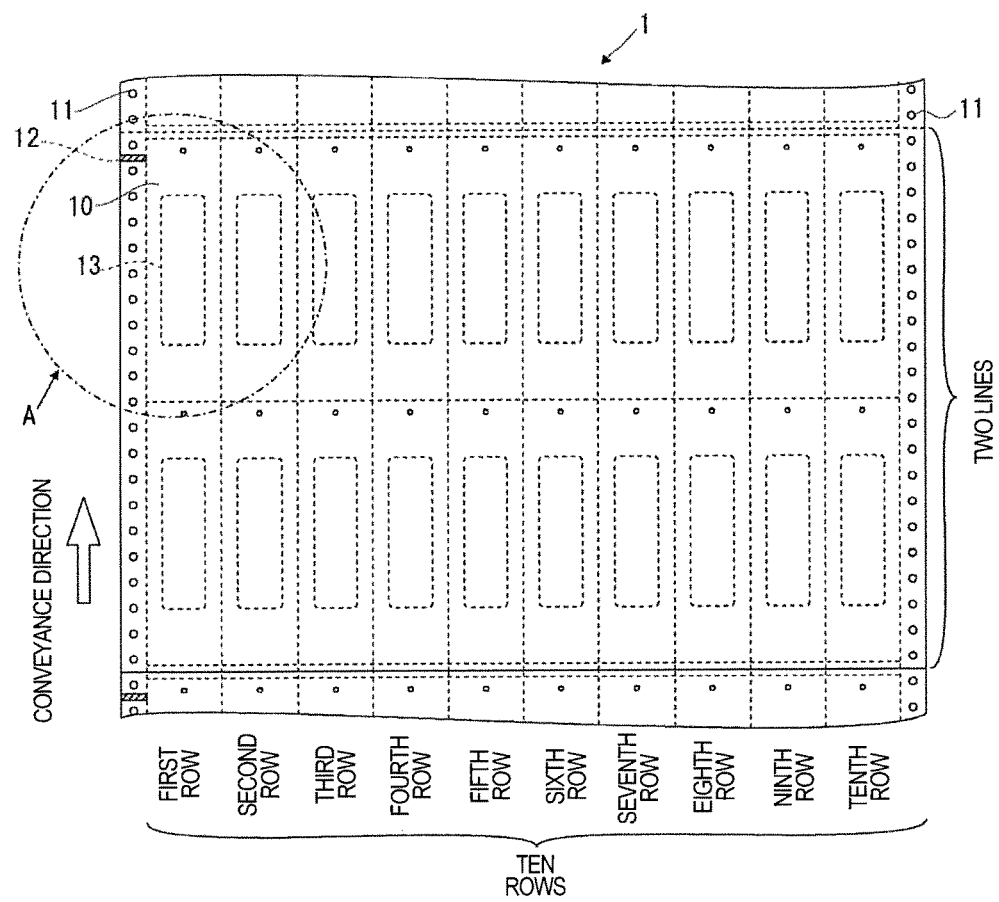
FIG. 2 is a top view illustrating configuration of a part of an IC tag continuous body illustrated in FIG. 1.

The IC tag continuous body 1 is a continuous sheet (fan-folded sheet) in which a page on which IC tags 10 are aligned in multiple rows is folded alternately by referring to FIG. 2. In this embodiment, 20 pieces, that is, 10 pieces*2 lines of the IC tags 10 from a first row to a tenth row are arranged on one page. On both sides of the IC tag continuous body 1, sprocket holes 11 are formed at an equal interval. Moreover, in the vicinity of a head of a conveyance direction in a region in which the sprocket holes 11 are formed, a detection mark 12 indicating start of the page is printed. The IC tag continuous body 1 may be a rolled sheet wound in a roll state and in this case, the detection mark 12 indicating the start of the IC tag 10 may be printed on every line.

Figure 3A:
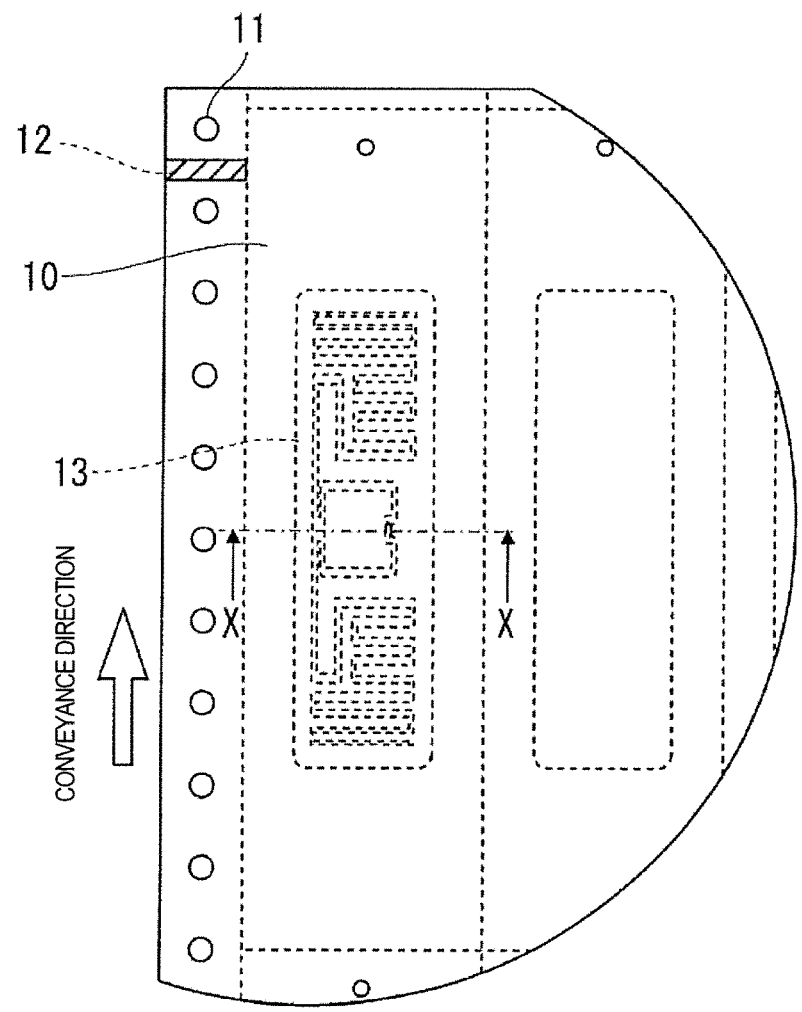
FIGS. 3A and 3B are an enlarged front view and a sectional view illustrating configuration of an IC tag illustrated in FIG. 2.
Figure 3B:
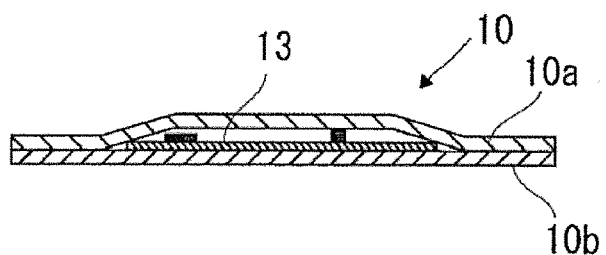

By referring to FIG. 3A, the IC tag 10 contains an inlay 13. The FIG. 3A is an enlarged front view of a region indicated by an arrow A in FIG. 2 and FIG. 3B is an X-X sectional view indicated in FIG. 3A. The IC tag 10 of this embodiment is a merchandise tag and as illustrated in FIG. 3B, the inlay 13 is contained by being interposed between a front sheet 10a and a back sheet 10b.

Figure 4:
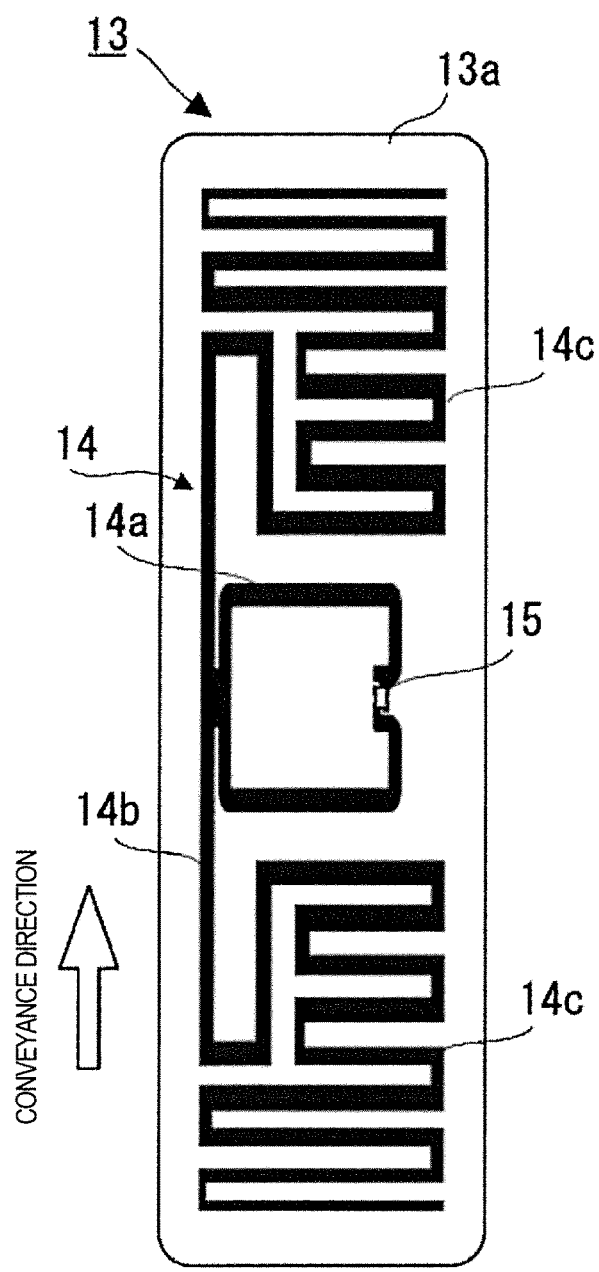
FIG. 4 is a front view illustrating configuration of inlay illustrated in FIG. 3.

The inlay 13 is, by referring to FIGS. 3B and 4, constituted by a base material 13a, an antenna 14, and an IC chip 15. Regarding the inlay 13, the base material 13a is constituted by a synthetic resin film, and a linear antenna 14 made of a conductor is formed on the base material 13a and then, an IC chip 15 is bonded on this antenna 14 by using a conductive adhesive, for example. The antenna 14 has an elongated shape with a conveyance direction as its longitudinal direction, and a loop-shaped antenna element 14a is provided at a center part in the longitudinal direction. And a dipole antenna element 14b connected to the loop-shaped antenna element 14a and extending linearly toward both front and rear ends in the longitudinal direction is provided. Moreover, a meander line antenna element 14c connected to the dipole antenna element 14b and configured to be folded in a zigzag manner in a width direction orthogonal to the conveyance direction is provided in front and rear of the loop-shaped antenna element 14a in the longitudinal direction, respectively.

The IC chip 15 incorporates a non-volatile memory such as EEPROM or the like in which memory is stored without power supply. The non-volatile memory of the IC chip 15 includes a tag ID storage region in which a unique number of each inlay 13 (hereinafter referred to as a tag ID) is stored in advance and a user storage region rewritable by a user. The IC chip 15 includes a communication function by an electromagnetic induction method for transmitting energy and signals by magnetic flux connection of an antenna coil of a reader/writer and the loop-shaped antenna element 14a of the antenna 14 and a communication function by a radio wave method for transmitting energy and signals by exchanging radio waves between the antenna of the reader/writer and the dipole antenna element 14b as well as the meander line antenna element 14c of the antenna 14.

A placing base 2 has a placing plate 21 on which the IC tag continuous body 1 is placed. The placing plate 21 is constituted capable of changing a position of a placing surface with respect to the pre-processing device 3 and the post-processing device 5 and an angle of the placing surface in accordance with a size or a paper quality of the IC tag continuous body 1. As a result, the IC tag continuous body 1 placed on the placing base 2 can be smoothly supplied to the pre-processing device 3 and the IC tag continuous body 1 issued from the post-processing device 5 can be orderly placed on the placing base 2.

The pre-processing device 3 is an encode device for writing data desired by a user such as a product number and the like in the respective IC tags 10 (the user storage region of the IC chip 15) of the IC tag continuous body 1. The pre-processing device 3 includes, by referring to FIGS. 1 and 5, a first antenna unit 31, a second antenna unit 32, a third antenna unit 33, a first tractor feeder unit 61, a first conveyance unit 62, a second conveyance unit 63, a first negative pressure suction unit 71, a second negative pressure suction unit 72, a third negative pressure suction unit 73, a fourth negative pressure suction unit 74, a first sensor 81, a second sensor 82, a third sensor 83, and a first rotary encoder unit 91.

Figure 5:
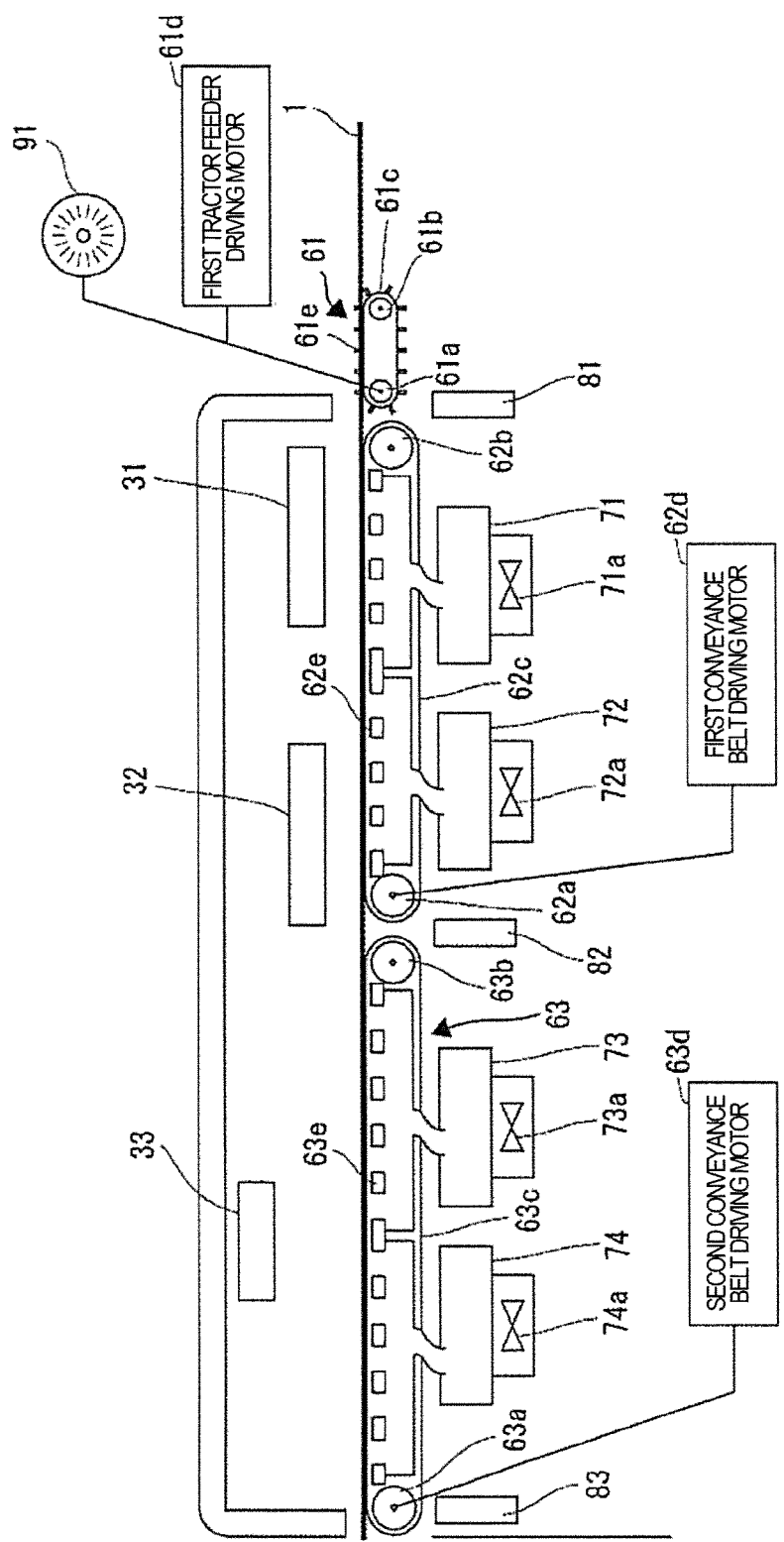
FIG. 5 is a schematic side view illustrating configuration of a pre-processing device illustrated in FIG. 1.
Figure 6:
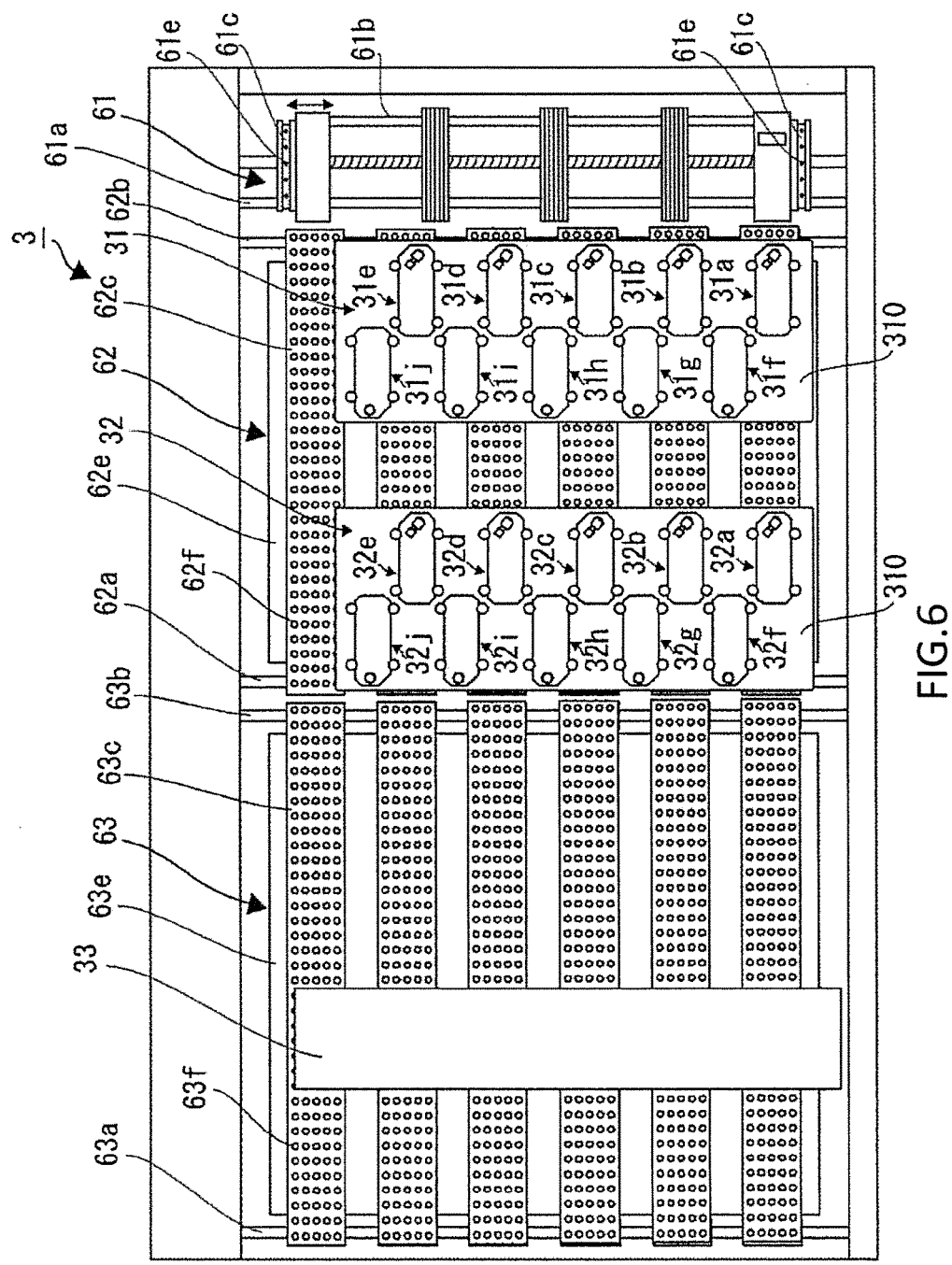
FIG. 6 is a schematic top view illustrating the configuration of the pre-processing device illustrated in FIG. 1.
Figure 7:
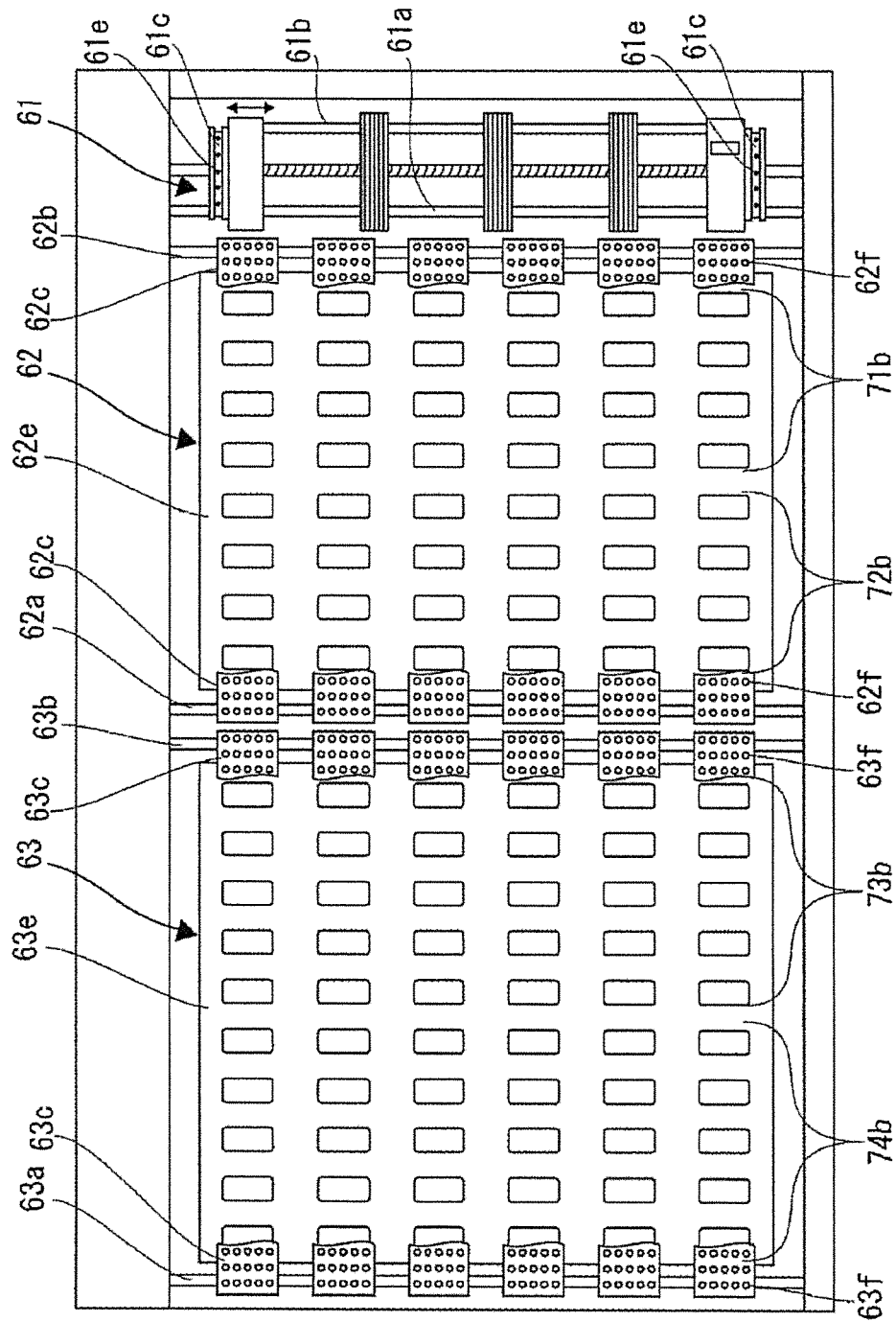
FIG. 7 is a schematic top view illustrating configuration of a support plate in the pre-processing device illustrated in FIG. 1.

The first tractor feeder unit 61 is arranged on an uppermost stream in reception of the IC tag continuous body 1 before issuance and by referring to FIGS. 5 to 7, an endless belt 61c extended between a driving roller 61a and a driven roller 61b and rotationally moved and a first tractor feeder driving motor 61d for rotationally moving the endless belt 61c through the driving roller 61a are provided, and on the endless belt 61c, feed pins 61e engaged with the sprocket holes 11 of the IC tag continuous body 1 are formed. As a result, as the first tractor feeder unit 61 rotationally moves the endless belt 61c, the feed pins 61e are sequentially engaged with the sprocket holes 11, capable of being disengaged, so as to tract and convey the IC tag continuous body 1 toward the first conveyance unit 62 on a downstream side. Moreover, on the driving roller 61a of the first tractor feeder unit 61, the first rotary encoder unit 91 for detecting rotation of the driving roller 61a is provided. In the vicinity of the first tractor feeder unit 61, the first sensor 81 for detecting the detection mark 12 of the IC tag continuous body 1 is provided. As a result, it is so configured that the position of the IC tag continuous body 1 (IC tag 10) in the pre-processing device 3 can be detected by the detection results of the first sensor 81 and the first rotary encoder unit 91.

The first conveyance unit 62 is arranged on the downstream side of the first tractor feeder unit 61 and includes an endless conveyance belt 62c extended between a driving roller 62a and a driven roller 62b and rotationally moved and a first conveyance belt driving motor 62d for rotationally moving the conveyance belt 62c through the driving roller 62a. The first conveyance unit 62 conveys the IC tag continuous body 1 placed on an upper surface of the conveyance belt 62c toward the second conveyance unit 63 on the downstream side by rotationally moving the conveyance belt 62c. Between the first conveyance unit 62 and the second conveyance unit 63, the second sensor 82 for detecting the detection mark 12 of the IC tag continuous body 1 is provided and is configured capable of detecting that the head of a page has reached between the first conveyance unit 62 and the second conveyance unit 63.

Moreover, at a position between the driving roller 62a and the driven roller 62b below the upper conveyance belt 62c, a support plate 62e is arranged at positions in contact with a lower surface (inner peripheral surface) of the upper conveyance belt 62c. Therefore, when the IC tag continuous body 1 is conveyed from the upstream side toward the downstream side, the conveyance belt 62c is rotationally moved while sliding on the support plate 62e.

At a spot of the support plate 62e faced with the conveyance belt 62c, suction holes 71b through which air is suctioned by rotation of a first suction fan 71a of the first negative pressure suction unit 71 and suction holes 72b through which air is suctioned by rotation of a second suction fan 72a of the second negative pressure suction unit 72 are formed in plural along the conveyance direction. In the conveyance belt 62c, a large number of through holes 62f are formed. Therefore, by a negative pressure by the first negative pressure suction unit 71 and the second negative pressure suction unit 72, the IC tag continuous body 1 is conveyed in a state in close contact with the conveyance belt 62c.

The second conveyance unit 63 is arranged on the downstream side of the first conveyance unit 62 and includes an endless conveyance belt 63c extended between a driving roller 63a and a driven roller 63b and rotationally moved and a second conveyance belt driving motor 63d for rotationally moving the conveyance belt 63c through the driving roller 63a. The second conveyance unit 63 conveys the IC tag continuous body 1 placed on the upper surface of the conveyance belt 63c toward the printing device 4 on the downstream side by rotationally moving the conveyance belt 63c. Between the second conveyance unit 63 and the printing device 4, the third sensor 83 for detecting the detection mark 12 of the IC tag continuous body 1 is provided and is configured capable of detecting that the head of a page has reached between the second conveyance unit 63 and the printing device 4.

Moreover, at a position between the driving roller 63a and the driven roller 63b below the upper conveyance belt 63c, a support plate 63e is arranged at a position in contact with a lower surface (inner peripheral surface) of the upper conveyance belt 63c. Therefore, when the IC tag continuous body 1 is conveyed from the upstream side toward the downstream side, the conveyance belt 63c is rotationally moved while sliding on the support plate 63e.

At a spot of the support plate 63e faced with the conveyance belt 63c, suction holes 73b through which air is suctioned by rotation of a third suction fan 73a of the third negative pressure suction unit 73 and suction holes 74b through which air is suctioned by rotation of a fourth suction fan 74a of the fourth negative pressure suction unit 74 are formed in plural along the conveyance direction. In the conveyance belt 63c, a large number of through holes 63f are formed. Therefore, by a negative pressure by the third negative pressure suction unit 73 and the fourth negative pressure suction unit 74, the IC tag continuous body 1 is conveyed in a state in close contact with the conveyance belt 63c.

Figure 8:
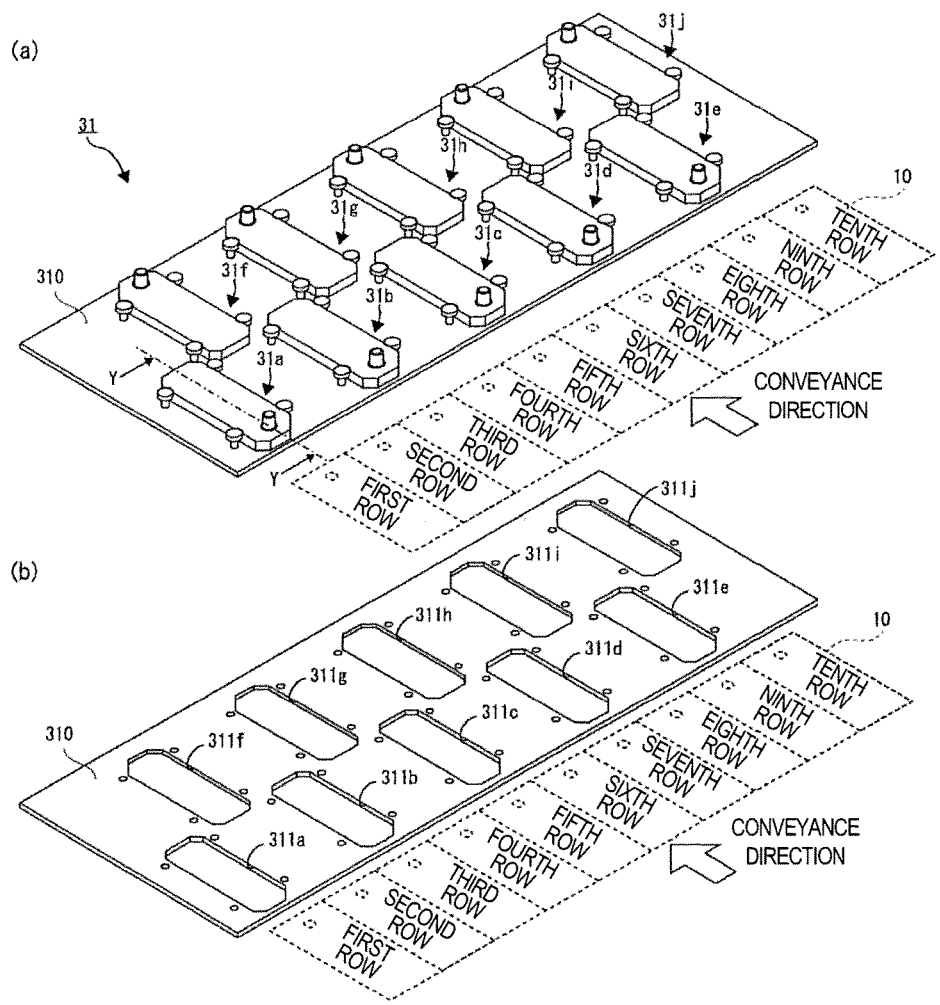
FIG. 8 is a perspective view illustrating configuration of a first antenna unit illustrated in FIG. 5.

The first antenna unit 31 and the second antenna unit 32 are arranged close to and facing above the first conveyance unit 62. The first antenna unit 31 and the second antenna unit 32 are antennas conducting communication with the IC tag 10 in the electromagnetic induction method and have the same configuration. The first antenna unit 31 is used for reading the tag ID from the IC tag 10. The second antenna unit 32 is used for writing the desired data such as a product number and the like in the IC tag 10 (the user storage region of the IC chip 15). Hereinafter, the data to be written to the IC tag 10 is called identification data. Hereinafter, configuration of the first antenna unit 31 will be described in detail by referring to FIGS. 8 to 10.

By referring to FIG. 8(a), in the first antenna unit 31, row antenna units 31a to 31j are arranged at positions facing the IC tags 10 from the first row to the tenth row of the IC tag continuous body 1 conveyed by the first conveyance unit 62, respectively. The row antenna units 31a to 31j are divided into the upstream-side row antenna units 31a to 31e and the downstream-side row antenna units 31f to 31j and arranged in a zigzag manner, in which the upstream-side row antenna units 31a to 31e are arranged by facing the IC tags 10 on the odd-number rows, respectively, while the downstream-side row antenna units 31f to 31j are arranged by facing the IC tags 10 on the even-number rows, respectively.

A shield plate 310 is a support plate supporting the row antenna units 31a to 31j and is constituted by metal such as aluminum or a conductive substance such as a conductive resin. The shield plate 310 is arranged in parallel with and close to the IC tag continuous body 1 conveyed by the first conveyance unit 62, and opening portions 311a to 311j corresponding to the row antenna units 31a to 31j, respectively, are formed by being divided into the upstream opening portions 311a to 311e and the downstream opening portions 311f to 311j in a zigzag manner. Each of the opening portions 311a to 311j has an elongated and substantially rectangular shape with the conveyance direction as its longitudinal direction, in which, regarding the upstream-side opening portions 311a to 311e, the shape of only one corner on the upstream side is different, while regarding the downstream opening portions 311f to 311j, the shape of only one corner on the downstream side is different. In the shield plate 310, regions formed between the upstream-side opening portions 311a to 311e and between the downstream opening portions 311f to 311j, respectively, are interfering preventing regions preventing interference among communication.

Figure 9:
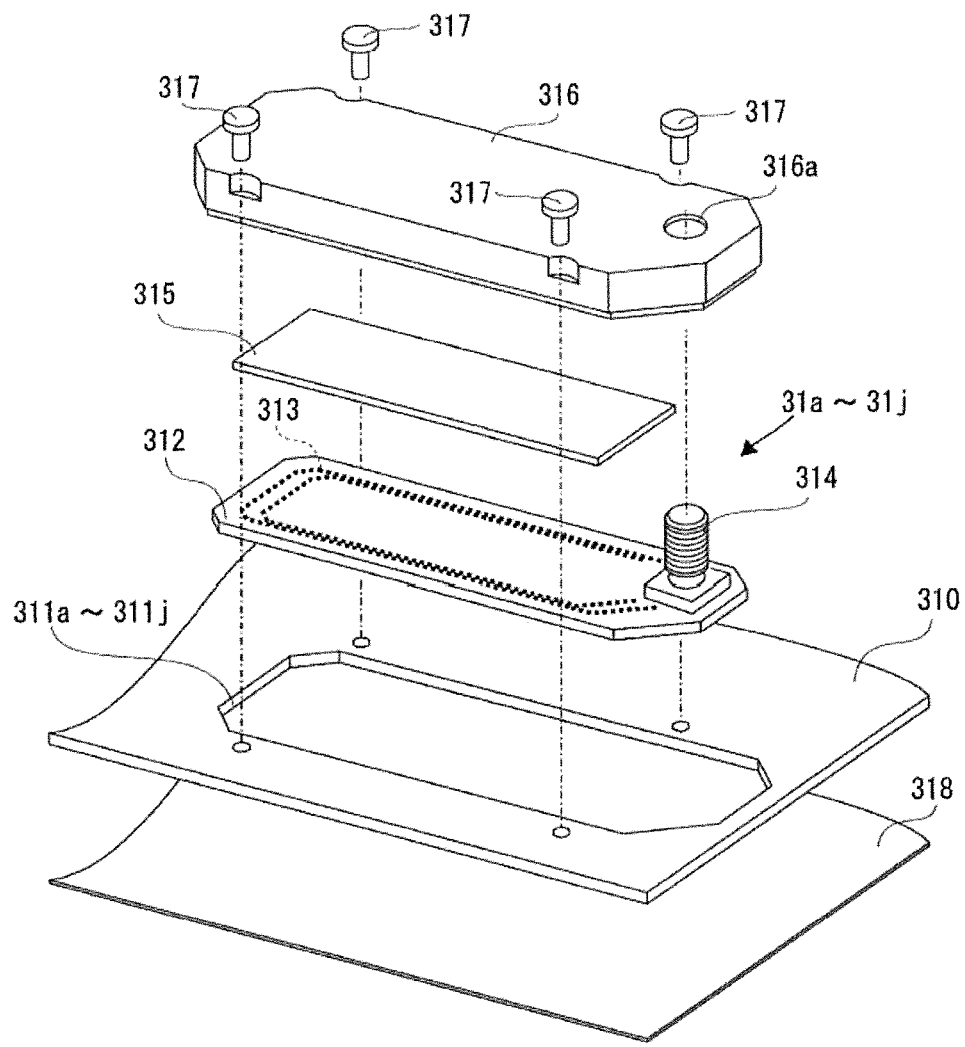
FIG. 9 is an exploded perspective view illustrating configuration of a row antenna unit illustrated in FIG. 8.
Figure 10:
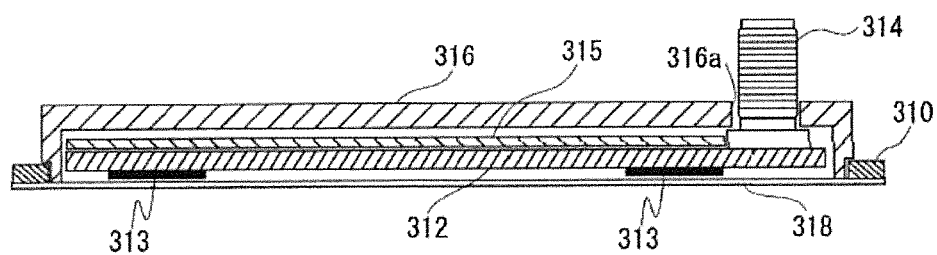
FIG. 10 is a sectional view illustrating the configuration of the row antenna unit illustrated in FIG. 8.

The row antenna units 31a to 31j are constituted by a printed board 312 having a substantially same shape as those of the opening portions 311a to 311j, a loop-shaped antenna element 313 formed on a lower surface of the printed board 312, an antenna terminal 314 installed upright on an upper surface opposite to the loop-shaped antenna element 313 on an end portion of the printed board 312, a ferrite sheet 315, and an antenna case 316 covering the printed board 312 from an upper surface side by referring to FIGS. 9 and 10. In the printed board 312, the shape of only one corner on the end portion side on which the antenna terminal 314 is installed upright is different. The antenna case 316 is constituted by metal such as aluminum or a conductive substance such as a conductive resin, an opening 316a for terminal through which the antenna terminal 314 is penetrated is formed, and by penetrating the antenna terminal 314 into the opening 316a for terminal in a state in which the ferrite sheet 315 is interposed between the antenna case 316 and the printed board 312 and by attaching a retaining ring, not shown, to the antenna terminal 314, the printed board 312 is fixed to the antenna case 316. The ferrite sheet 315 covers the loop-shaped antenna element 313 from the upper surface side of the printed board 312 and can suppress radiation from the printed board 312. Then, the antenna case 316 is fixed to the upper surface side of the shield plate 310 by a screw 317 so that the printed boards 312 are fitted into the opening portions 311a to 311j. In this state, those other than the surface faced with the IC tag continuous body 1 are electromagnetically shielded, and the surface of the printed board 312 on which the loop-shaped antenna element 313 is formed is directly faced with the IC tag continuous body 1 conveyed by the first conveyance unit 62.

In the opening portions 311a to 311j and the printed board 312, only one corner has a different elongated and substantially rectangular shape and thus, they are fitted in one unique direction. In the opening portions 311a to 311e on the upstream side, the shape of only one corner on the upstream side is different and thus, in each of the row antenna units 31a to 31e on the upstream side, the antenna terminal 314 installed upright on the end portion of the printed board 312 is located on the upstream side. Moreover, in the opening portions 311f to 311j on the downstream side, the shape of only one corner on the downstream side is different and thus, in each of the row antenna units 31f to 31j on the downstream side, the antenna terminal 314 installed upright on the end portion of the printed board 312 is located on the downstream side. As described above, each of the antenna terminals 314 of the row antenna units 31a to 31e arranged on the upstream side and each of the antenna terminals 314 of the row antenna units 31f to 31j arranged on the downstream side are arranged in directions separated away from each other, respectively. As a result, interference between the each of the antenna terminals 314 of the row antenna units 31a to 31e arranged on the upstream side and each of the antenna terminals 314 of the row antenna units 31f to 31j arranged on the downstream side can be prevented.

Reference numeral 318 denoted in FIGS. 9 and 10 is a non-adhesive coating sheet such as a silicone coating sheet bonded to the lower surface of the shield plate 310 so as to cover the opening portions 311a to 311j. If the IC tag continuous body 1 is a label continuous body temporarily attached to a mount, by providing the non-adhesive coating sheet 318, adhesion of the label to the shield plate 310 can be prevented. The non-adhesive coating sheet 318 can be bonded so as to cover the whole shield plate 310 including the opening portions 311a to 311j on the lower surface.

The third antenna unit 33 is arranged facing above the second conveyance unit 63. The third antenna unit 33 is an antenna conducting communication with the IC tag 10 in a radio wave method different from those of the first antenna unit 31 and the second antenna unit 32. The third antenna unit 33 is used for writing identification data in the IC tag 10.

The printing device 4 is printing means for applying printing of data of a product or a producer or a barcode obtained by coding it or the like on the surfaces of the respective IC tags 10 of the IC tag continuous body 1. Hereinafter, the data of a product or a producer or data such as a barcode obtained by coding it or the like to be printed on the surface of the IC tag 10 will be referred to as print data. The printing device 4 includes, by referring to FIG. 11, a print unit 41, an optical fixation unit 42, and a filter unit 43 and by referring to FIG. 1, a second tractor feeder unit 64, a third conveyance unit 65, a discharge roller 66, and a fifth negative pressure suction unit 75.

Figure 11:
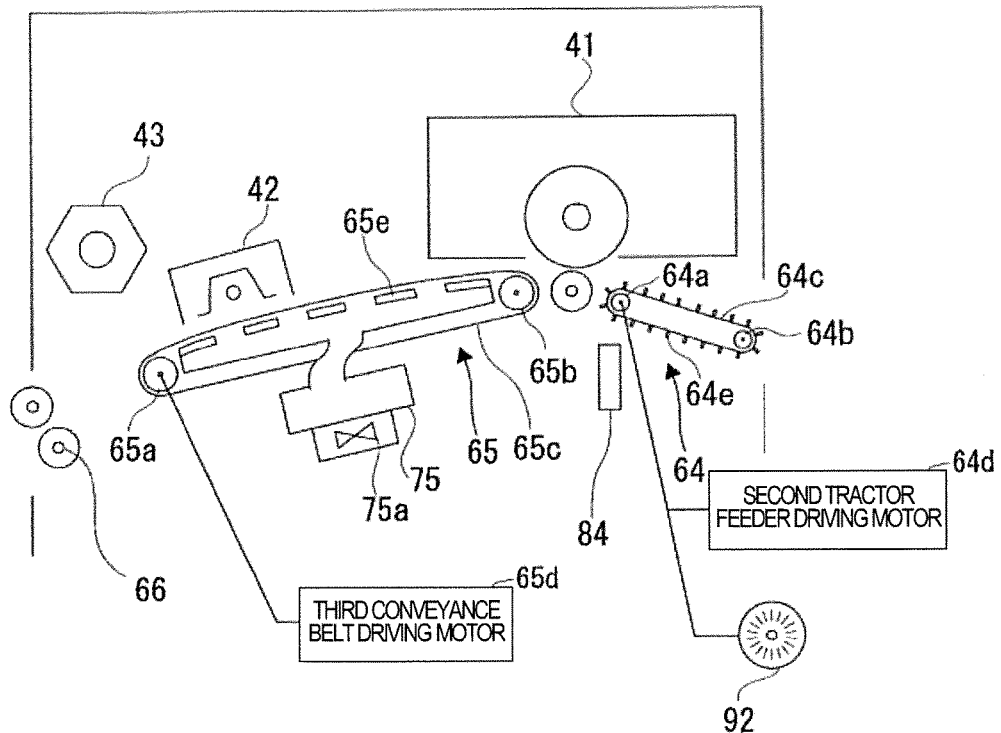
FIG. 11 is a schematic side view illustrating configuration of a printing device illustrated in FIG. 1.

The second tractor feed unit 64 is arranged on the uppermost stream receiving the IC tag continuous body 1 from the pre-processing device 3 and by referring to FIG. 11, includes an endless belt 64c extended between a driving roller 64a and a driven roller 64b and rotationally moved and a second tractor feeder driving motor 64d for rotationally moving the endless belt 64c through the driving roller 64a, and on the endless belt 64c, feed pins 64e engaged with the sprocket holes 11 of the IC tag continuous body 1 are formed. As a result, as the second tractor feeder unit 64 rotationally moves the endless belt 64c, the feed pins 64e are sequentially engaged with the sprocket holes 11, capable of being disengaged, so as to tract and convey the IC tag continuous body 1 toward the print unit 41 on a downstream side. Moreover, on the driving roller 64a of the second tractor feeder unit 64, a second rotary encoder unit 92 for detecting rotation of the driving roller 64a is provided. Between the second tractor feeder unit 64 and the print unit 41, a fourth sensor 84 for detecting the detection mark 12 of the IC tag continuous body 1 is provided. As a result, it is so configured that the position of the IC tag continuous body 1 (IC tag 10) in the printing device 4 can be detected by the detection results of the fourth sensor 84 and the second rotary encoder unit 92.

The print unit 41 employs an electrophotography method such as a laser in which a latent image is formed by laser beams on a photosensitive drum, and this latent image is developed by a toner and then transferred to the surface of the IC tag 10. The print unit 41 applies printing of data of a product or a producer or a barcode obtained by coding it or the like on the surfaces of the respective IC tags 10 on the IC tag continuous body 1 and also prints a page number in a region in the vicinity of a page head other than the IC tag 10 or a region in which the sprocket holes 11 are formed, for example. A print method of the print unit 41 is not limited to the electrophotography method but a heat transfer method, a thermal method or an inkjet method can be also used.

The third conveyance unit 65 is arranged on the downstream side of the print unit 41 and includes an endless conveyance belt 65c extended between a driving roller 65a and a driven roller 65b and rotationally moved and a third conveyance belt driving motor 65d for rotationally moving the conveyance belt 65c through the driving roller 65a. The third conveyance unit 65 conveys the IC tag continuous body 1 placed on the upper surface of the conveyance belt 65c toward the post-processing device 5 through the discharge roller 66 on the downstream side by rotationally moving the conveyance belt 65c.

At a position between the driving roller 65a and the driven roller 65b below the upper conveyance belt 65c, a support plate 65e is arranged at a position in contact with the lower surface (inner peripheral surface) of the upper conveyance belt 65c. Therefore, when the IC tag continuous body 1 is conveyed from the upstream side toward the downstream side, the conveyance belt 65c is rotationally moved while sliding on the support plate 65e.

In a spot of the support plate 65e facing the conveyance belt 65c, a plurality of suction holes through which air is suctioned by rotation of the fifth suction fan 75a of the fifth negative pressure suction unit 75 are formed along the conveyance direction. In the conveyance belt 65c, a large number of though holes are formed. Therefore, the IC tag continuous body 1 is conveyed by the negative pressure by the fifth negative pressure suction unit 75 in a state in close contact with the conveyance belt 65c.

The optical fixation unit 42 fixes a toner image by melting toner having been transferred by the print unit 41 by irradiating flash light using a xenon tube or the like to the surface of the IC tag continuous body 1 conveyed by the third conveyance unit 65. As a result, the toner image can be fixed in a non-contact manner without causing damage (external force) to the IC tag 10.

The filter unit 43 is an air filter for erasing gas or odor generated in optical fixation by the optical fixation unit 42.

The post-processing device 5 verifies that the identification data has been correctly written to the respective IC tags 10 of the IC tag continuous body 1 and also marks the IC tag 10 in which the identification data has not been correctly written. The post-processing device 5 includes, by referring to FIG. 12, a fourth antenna unit 51, an emboss processing unit 52, a fourth conveyance unit 67, a sixth negative pressure suction unit 76, a seventh negative pressure suction unit 77, a page-number reading unit 93, a fifth sensor 85, a sixth sensor 86, and a seventh sensor 87.

The fourth conveyance unit 67 includes an endless conveyance belt 67c arranged on the uppermost stream of the post-processing device 5 receiving the IC tag continuous body 1 from the printing device 4 and extended between a driving roller 67a and a driven roller 67b and rotationally moved, and a fourth conveyance belt driving motor 67d for rotationally moving the conveyance belt 67c through the driving roller 67a. The fourth conveyance unit 67 conveys the IC tag continuous body 1 placed on the upper surface of the conveyance belt 67c toward the emboss processing unit 52 on the downstream side by rotationally moving the conveyance belt 67c. Between the fourth conveyance unit 67 and the emboss processing unit 52, the sixth sensor 86 for detecting the detection mark 12 of the IC tag continuous body 1 is provided and is configured capable of detecting that the head of a page has reached between the fourth conveyance unit 67 and the emboss processing unit 52. Moreover, at a discharge port of the emboss processing unit 52, the seventh sensor 87 for detecting the detection mark 12 of the IC tag continuous body 1 is provided and is configured capable of detecting jamming (paper jam) or the like at the emboss processing unit 52.

Moreover, at a position between the driving roller 67a and the driven roller 67b below the upper conveyance belt 67c, a support plate 67e is arranged at a position in contact with a lower surface (inner peripheral surface) of the upper conveyance belt 67c. Therefore, when the IC tag continuous body 1 is to be conveyed from the upstream side toward the downstream side, the conveyance belt 67c is rotationally moved while sliding on the support plate 67e.

In a spot of the support plate 67e facing the conveyance belt 67c, suction holes through which air is suctioned by rotation of the sixth suction fan 76a of the sixth negative pressure suction unit 76 and suction holes through which the air is suctioned by rotation of the seventh suction fan 77a of the seventh negative pressure suction unit 77 are formed in plural along the conveyance direction. In the conveyance belt 67c, a large number of though holes are formed. Therefore, the IC tag continuous body 1 is conveyed by the negative pressures by the sixth negative pressure suction unit 76 and the seventh negative pressure suction unit 77 in a state in close contact with the conveyance belt 67c.

The fifth sensor 85 is arranged in the vicinity of the uppermost stream in the post-processing device 5 receiving the IC tag continuous body 1 from the printing device 4 and is configured capable of detecting that the head of the page has reached the post-processing device 5. Moreover, the page-number reading unit 93 is also arranged in the vicinity of the uppermost stream receiving the IC tag continuous body 1 from the printing device 4, and when the fact that the head of the page has reached the post-processing device 5 is detected by the fifth sensor 85, by photographing the surface of the IC tag continuous body 1, the page number printed by the printing device 4 is read.

The fourth antenna unit 51 is arranged facing above the fourth conveyance unit 67. The fourth antenna unit 51 is an antenna conducting communication with the IC tag 10 in a radio wave method different from those of the first antenna unit 31 and the second antenna unit 32. The fourth antenna unit 51 is used for reading the tag ID and the identification data written to the IC tag 10 from the IC tag 10 conveyed by the fourth conveyance unit 67.

Figure 12:
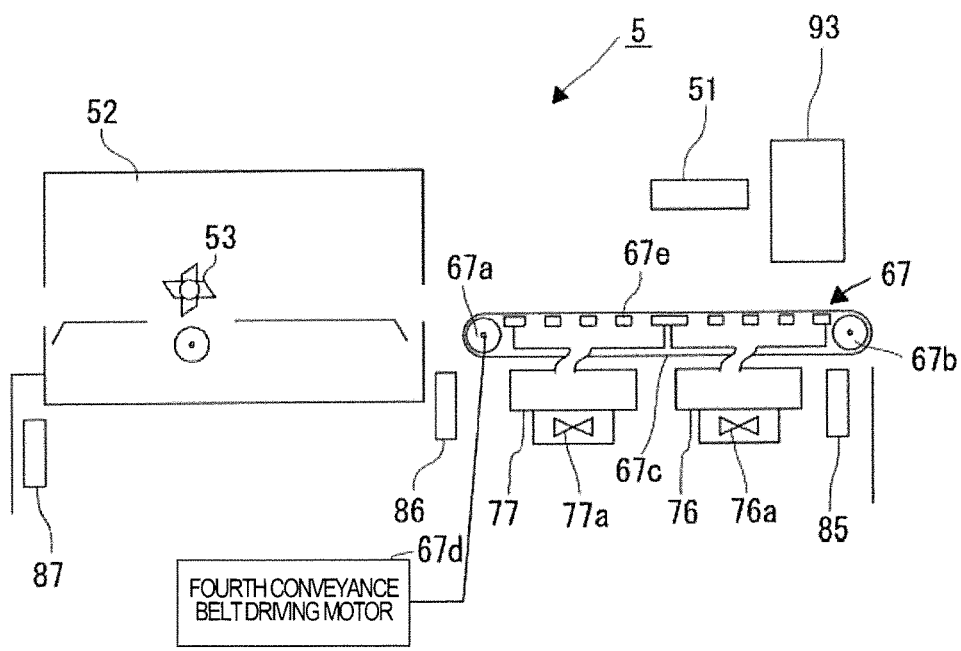
FIG. 12 is a schematic side view illustrating configuration of a post-processing device illustrated in FIG. 1.

The emboss processing unit 52 includes, by referring to FIG. 12, cutter members 53 corresponding to each of the IC tags 10 in multiple rows, respectively. The cutter member 53 is mark giving means for executing emboss processing of cutting and bending a part of an end portion of the IC tag 10. Then, the emboss processing unit 52 executes the emboss processing by cutting/raising and bending the part of the end portion to the IC tag 10, by using the cutter member 53, in which the identification data could not be written correctly.

The first antenna unit 31 as well as the second antenna unit 32, the third antenna unit 33, and the fourth antenna unit 51 are arranged facing the conveyance belt 62c of the first conveyance unit 62 as well as the support plate 62e, the conveyance belt 63c of the second conveyance unit 63 as well as the support plate 63e, and the conveyance belt 67c of the fourth conveyance unit 67 as well as the support plate 67e, respectively. Therefore, the conveyance belts 62c, 63c, and 67c as well as the support plates 62e, 63e, and 67e preferably have low dielectric constants so that a resonant frequency of the antenna of the IC tag continuous body 1 (IC tags 10) does not change in order to keep transaction between the IC tag continuous body 1 (IC tags 10) facing each of the antenna units favorable. Moreover, the conveyance belts 62c, 63c, and 67c slide in a state subjected to a negative pressure in directions of the support plates 62e, 63e, and 67e, respectively, and thus, it is important that friction caused by sliding between the conveyance belts 62c, 63c, and 67c and the support plates 62e, 63e, and 67e is small, and the conveyance belts 62c, 63c, and 67c and the support plates 62e, 63e, and 67e have excellent friction resistance (material with low friction coefficients) and hard to be electrically charged. Thus, in this embodiment, urethane belts are used for the conveyance belts 62c, 63c, and 67c, and POM (polyacetal resin) plates are used for the support plates 62e, 63e, and 67e.

Figure 13:
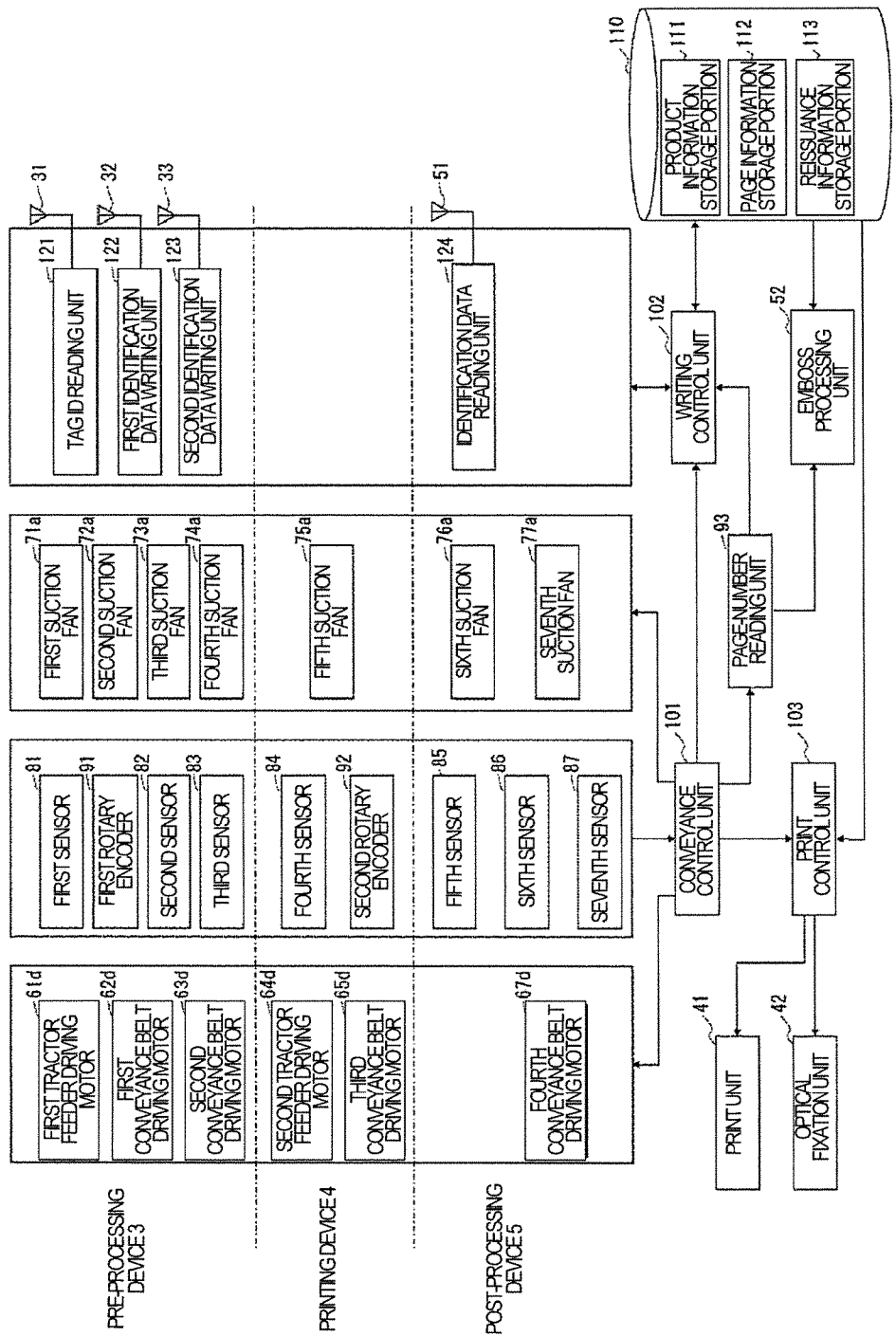
FIG. 13 is a block diagram illustrating configuration of a control unit controlling an operation of an embodiment of an IC tag issuing apparatus according to the present invention.

Subsequently, configuration of the control unit for controlling an operation of the IC tag issuing apparatus of this embodiment will be described in detail by referring to FIGS. 13 to 15. The IC tag issuing apparatus of this embodiment includes, by referring to FIG. 13, a conveyance control unit 101, a writing control unit 102, a print control unit 103, an information storage unit 110, a tag ID reading unit 121, a first identification data writing unit 122, a second identification data writing unit 123, and an identification data reading unit 124.

The conveyance control unit 101 is an information processing unit such as a microcomputer including a CPU (Central Processing Unit), a ROM (Read Only Memory), a RAM (Random Access Memory) and the like. The ROM of the conveyance control unit 101 stores a control program for performing conveyance control of the IC tag continuous body 1. The conveyance control unit 101 causes the IC tag continuous body 1 to be conveyed by controlling a conveyance constituent element group (the first tractor feeder driving motor 61d, the first conveyance belt driving motor 62d, the second conveyance belt driving motor 63d, the second tractor feeder driving motor 64d, the third conveyance belt driving motor 65d, the fourth conveyance belt driving motor 67d) and a suction constituent element group (the first suction fan 71a, the second suction fan 72a, the third suction fan 73a, the fourth suction fan 74a, the fifth suction fan 75a, the sixth suction fan 76a, the seventh suction fan 77a) in accordance with inputs from a position sensor group (the first sensor 81, the first rotary encoder unit 91, the second sensor 82, the third sensor 83, the fourth sensor 84, the second rotary encoder unit 92, the fifth sensor 85, the sixth sensor 86, the seventh sensor 87) by reading the control program stored in the ROM and extending the control program to the RAM.

The writing control unit 102 is an information processing unit such as a microcomputer or the like including a CPU (Central Processing Unit), a ROM (Read Only Memory), a RAM (Random Access Memory) and the like. The ROM of the writing control unit 102 stores a control program for writing the identification data in the respective IC tags 10 of the IC tag continuous body 1. The writing control unit 102 writes the identification data in the respective IC tags 10 of the IC tag continuous body 1 by reading the control program stored in the ROM and by extending the control program to the RAM so as to control a communication constituent element group (the tag ID reading unit 121, the first identification data writing unit 122, the second identification data writing unit 123, the identification data reading unit 124).

The print control unit 103 is an information processing unit such as a microcomputer or the like including a CPU (Central Processing Unit), a ROM (Read Only Memory), a RAM (Random Access Memory) and the like. The ROM of the print control unit 103 stores a control program for operating the print unit 41 and the optical fixation unit 42. The print control unit 103 causes the print data to be printed on the surfaces of the respective IC tags 10 of the IC tag continuous body 1 by reading the control program stored in the ROM and by extending the control program to the RAM so as to control the print unit 41 and the optical fixation unit 42.

The information storage unit 110 is storage means such as a semiconductor memory, a HDD (Hard Disk Drive) and the like and includes a product information storage portion 111, a page information storage portion 112, and a reissuance information storage portion 113.

The product information storage portion 111 is storage means for storing product information input through a network, not shown, or various recording media. The product information is list information composed of identification data (management number and the like) to be written to the respective IC tags 10 of the IC tag continuous body 1, print data (product number, product name and the like) to be printed on the surfaces of the respective IC tags 10 of the IC tag continuous body 1, and the tag ID of the IC tag 10 in which the identification data is written as illustrated in FIG. 14. The tag ID is empty as illustrated in FIG. 14A until the identification data is written to the IC tag 10, and the tag ID of the IC tag 10 in which the identification data has been written is described as illustrated in FIG. 14B after the identification data is written to the IC tag 10.

The page information storage portion 112 is storage means for storing page information generated for each page of the IC tag continuous body 1. The page information is composed of, by referring to FIG. 15A, matrix information indicating a position of the tag ID on the page, the read-out tag ID, the identification data (management number and the like) to be written to the respective IC tags 10 of one page, the print data (product number, product name and the like) to be printed on the surfaces of the respective IC tags 10 of one page, and the tag ID of the IC tag 10 in which the identification data is written. As the page information storage portion 112, a storage region may be ensured on the RAM of the writing control unit 102 or the print control unit 103 so as to be used as a buffer.

The reissuance information storage portion 113 is storage means for storing reissuance information for reissuance altogether at the end. The reissuance information is composed of, by referring to FIG. 15B, the identification data which failed to be written to the IC tag 10 and the corresponding print data (product number, product name and the like).

The tag ID reading unit 121 is a reader/writer for reading the tag ID in an electromagnetic induction method from the IC tag 10 of the IC tag continuous body 1 being conveyed by the first conveyance unit 62 by using the first antenna unit 31. The tag ID reading unit 121 has a function of conducting communication with the IC tag 10 through a plurality of channels with different frequencies and is configured to use different channels for the row antenna units 31a to 31j adjacent at least in the width direction and a diagonal direction.

The first identification data writing unit 122 is a reader/writer for writing the identification data in the electromagnetic induction method in the IC tag 10 of the IC tag continuous body 1 being conveyed by the first conveyance unit 62 by using the second antenna unit 32. The first identification data writing unit 122 has a function of conducting communication with the IC tag 10 through a plurality of channels with different frequencies and is configured to use different channels for the row antenna units 32a to 32j adjacent at least in the width direction and the diagonal direction.

The second identification data writing unit 123 is a reader/writer for writing the identification data in the radio wave method in the IC tag 10 of the IC tag continuous body 1 being conveyed by the second conveyance unit 63 by using the third antenna unit 33.

The identification data reading unit 124 is a reader/writer for reading the tag ID and the identification data in the radio wave method from the IC tag 10 of the IC tag continuous body 1 being conveyed by the fourth conveyance unit 67 by using the fourth antenna unit 51.

Subsequently, a conveyance operation of the IC tag continuous body 1 in the IC tag issuing apparatus of this embodiment will be described in detail by referring to FIG. 16. When the IC tag continuous body 1 is set on the first tractor feeder unit 61 and a start button, not shown, is pressed down, the conveyance control unit 101 causes the IC tag continuous body 1 to be conveyed by controlling the conveyance constituent element group (the first tractor feeder driving motor 61d, the first conveyance belt driving motor 62d, the second conveyance belt driving motor 63d, the second tractor feeder driving motor 64d, the third conveyance belt driving motor 65d, the fourth conveyance belt driving motor 67d) and the suction constituent element group (the first suction fan 71a, the second suction fan 72a, the third suction fan 73a, the fourth suction fan 74a, the fifth suction fan 75a, the sixth suction fan 76a, the seventh suction fan 77a). In the IC tag issuing apparatus of this embodiment, conveyance of the IC tag continuous body 1 is performed on the basis of a conveyance speed of the second tractor feeder unit 64 of the printing device 4. That is, in the second tractor feeder unit 64, since the feed pins 64e are engaged with the sprocket holes 11, the IC tag continuous body 1 is conveyed at the conveyance speed of the second tractor feeder unit 64. On the other hand, the conveyance speeds of the first conveyance unit 62 and the second conveyance unit 63 of the pre-processing device 3 are set slower than the conveyance speed of the second tractor feeder unit 64, and the conveyance speed of the fourth conveyance unit 67 of the post-processing device 5 is set faster than the conveyance speed of the second tractor feeder unit 64. Therefore, in the first conveyance unit 62 and the second conveyance unit 63 of the pre-processing device 3, since the speed at which the IC tag continuous body 1 is conveyed is faster than the rotational moving speeds of the conveyance belts 62c and 63c of the first conveyance unit 62 and the second conveyance unit 63, the IC tag continuous body 1 is pulled to the downstream side in the conveyance direction and is conveyed while slightly sliding on the conveyance belts 62c and 63c. Moreover, in the fourth conveyance unit 67 of the post-processing device 5, since the speed at which the IC tag continuous body 1 is conveyed is slower than the rotational moving speed of the conveyance belt 67c of the fourth conveyance unit 67, the IC tag continuous body 1 is pulled to the upstream side in the conveyance direction and is conveyed while slightly sliding on the conveyance belt 67c. At this time, on the IC tag continuous body 1, a force acts in a direction to be brought into close contact with the conveyance belts 62c, 63c, and 67c by the negative pressures of the first negative pressure suction unit 71, the second negative pressure suction unit 72, the third negative pressure suction unit 73, the fourth negative pressure suction unit 74, the sixth negative pressure suction unit 76, and the seventh negative pressure suction unit 77. Therefore, the IC tag continuous body 1 is conveyed in a state keeping a tension in the conveyance direction without rattling in the first conveyance unit 62 and the second conveyance unit 63 of the pre-processing device 3 and the fourth conveyance unit 67 of the post-processing device 5. With respect to the conveyance speed of the second tractor feeder unit 64, the conveyance speed of the first conveyance unit 62 and the second conveyance unit 63 of the pre-processing device 3 is preferably set within a range of 90 to 99%, and the conveyance speed of the fourth conveyance unit 67 of the post-processing device 5 within 101 to 110% in accordance with a friction force of each of the conveyance belts and a suction force of each of the suction fans. As a result, a partial rise of the sprocket hole 11 (breakage or removal of the sprocket hole 11) can be prevented, skewing of the IC tag continuous body 1 can be prevented, and moreover, generation of wrinkles of the IC tag continuous body 1 can be prevented, and a sheet cut at perforation between pages of the IC tag continuous body 1 can be prevented. Moreover, the first tractor feeder unit 61 of the pre-processing device 3 is driven only in an initial stage until the tip end of the IC tag continuous body 1 reaches the printing device 4 and then, stops driving and enters a free state after that. Therefore, since the first tractor feeder unit 61 of the pre-processing device 3 has the feed pins 61e engaged with the sprocket holes 11, it is rotationally moved at a speed at which the IC tag continuous body 1 is conveyed by the second tractor feeder unit 64 of the printing device 4.

The conveyance control unit 101 has a function of changing the suction force by the first negative pressure suction unit 71, the second negative pressure suction unit 72, the third negative pressure suction unit 73, the fourth negative pressure suction unit 74, the sixth negative pressure suction unit 76, and the seventh negative pressure suction unit 77 in plural stages, respectively (10 stages in this embodiment) by controlling the rotation numbers of the first suction fan 71a, the second suction fan 72a, the third suction fan 73a, the fourth suction fan 74a, the sixth suction fan 76a, and the seventh suction fan 77a, respectively. The conveyance control unit 101 receives sheet information (sheet type, sheet thickness and the like) of the IC tag continuous body 1 by input means, not shown, and conveys the IC tag continuous body 1 by the suction force according to the sheet information of the IC tag continuous body 1 in the pre-processing device 3 (first conveyance unit 62, the second conveyance unit 63) until the IC tag continuous body 1 is set on the first tractor feeder unit 61 and reaches the printing device 4 (second tractor feeder unit 64).

Figure 16:
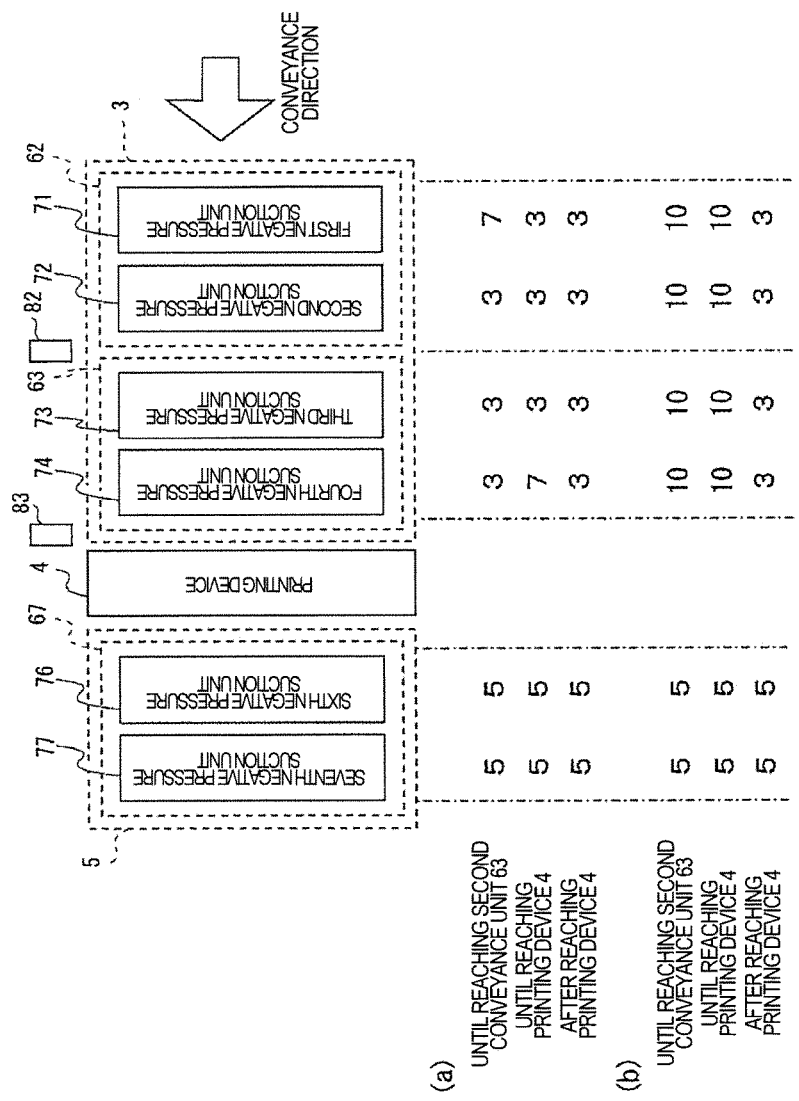
FIG. 16 is an explanatory view for explaining a conveyance operation in an embodiment of the IC tag issuing apparatus according to the present invention.

FIG. 16(a) is an explanatory view for explaining a control method of the suction force when a "thick sheet" such as a "merchandise tag" (price tag) is used as the sheet information of the IC tag continuous body 1. Numeral values in tables in (a) and (b) of FIG. 16 indicate the stage level of the suction force by the first negative pressure suction unit 71, the second negative pressure suction unit 72, the third negative pressure suction unit 73, the fourth negative pressure suction unit 74, the sixth negative pressure suction unit 76, and the seventh negative pressure suction unit 77 and that the larger the numeral value is, the stronger the suction force is. If the "thick sheet" is used as the sheet information, when the IC tag continuous body 1 is set on the first tractor feeder unit 61 and a start button, not shown, is pressed down, the conveyance control unit 101 controls the suction constituent element group and controls the suction force of the first negative pressure suction unit 71 arranged at a spot receiving the IC tag continuous body 1 from the first tractor feeder unit 61 in the first conveyance unit 62 to "7" and controls the suction forces of the second negative pressure suction unit 72 in the first conveyance unit 62, the third negative pressure suction unit 73 and the fourth negative pressure suction unit 74 in the second conveyance unit 63 to "3". The suction force "3" is the suction force of an ordinary operation in which the IC tag continuous body 1 reaches the printing device 4 and the subsequent conveyance based on the second tractor feeder unit 64 is being performed and this applies to all regardless of the sheet information. Therefore, in a state in which the IC tag continuous body 1 is being conveyed only by the first tractor feeder unit 61 and the first conveyance unit 62, the suction force at the spot (the first negative pressure suction unit 71) where the IC tag continuous body 1 is received from the first tractor feeder unit 61 is controlled stronger than usual. As a result, at delivery of the IC tag continuous body 1 from the first tractor feeder unit 61 to the first conveyance unit 62, meandering or skewing of the IC tag continuous body 1 and rising of the tip end of the IC tag continuous body 1 can be prevented.

Subsequently, when the detection mark 12 of the IC tag continuous body 1 is detected by the second sensor 82, the conveyance control unit 101 stops driving of the first tractor feeder unit 61 into a free state. Then, the conveyance control unit 101 controls the suction forces of the first negative pressure suction unit 71 and the second negative pressure suction unit 72 in the first conveyance unit 62 and the third negative pressure suction unit 73 in the second conveyance unit 63 to "3" and controls the suction force of the fourth negative pressure suction unit 74 arranged at a spot where the IC tag continuous body 1 is delivered to the printing device 4 (second tractor feeder unit 64) in the second conveyance unit 63 to "7". Therefore, in the state in which the IC tag continuous body 1 is conveyed only by the first conveyance unit 62 and the second conveyance unit 63, the suction force at the spot (fourth negative pressure suction unit 74) where the IC tag continuous body 1 is delivered to the printing device 4 is controlled stronger than usual. As a result, at delivery of the IC tag continuous body 1, the IC tag continuous body 1 can be reliably delivered from the second conveyance unit 63 to the printing device 4 without meandering or skewing of the IC tag continuous body 1 and rising of the tip end thereof. Then, when the detection mark 12 of the IC tag continuous body 1 is detected by the third sensor 83 and the IC tag continuous body 1 is delivered from the second conveyance unit 63 to the printing device 4 (second tractor feeder unit 64), the operation proceeds to the aforementioned ordinary operation.

In the printing device 4, at the reception of the IC tag continuous body 1, initialization processing of moving the feed pin 64e of the second tractor feeder unit 64 to a home position is executed. This initialization processing is configured to be executed at timing when the detection mark 12 of the IC tag continuous body 1 is detected by the second sensor 82 before the IC tag continuous body 1 reaches the printing device 4. Then, when the detection mark 12 of the IC tag continuous body 1 is detected by the third sensor 83, the conveyance control unit 101 starts driving of the second tractor feeder unit 64 at predetermined timing and causes the feed pins 64e to be engaged with the sprocket holes 11 of the IC tag continuous body 1 delivered from the second conveyance unit 63.

Moreover, in the second tractor feeder unit 64, a sheet detection sensor, not shown, for detecting the IC tag continuous body 1 is provided. This sheet detection sensor is constituted by an actuator rotationally moving in contact with the IC tag continuous body 1 conveyed by the second tractor feeder unit 64 and a photo sensor for detecting the rotational movement of the actuator, for example. Then, the conveyance control unit 101 determines whether or not delivery of the IC tag continuous body 1 has succeeded by an output from the sheet detection sensor, not shown, of the second tractor feeder unit 64 at delivery of the IC tag continuous body 1 from the second conveyance unit 63 to the second tractor feeder unit 64. If the IC tag continuous body 1 is detected by the sheet detection sensor, not shown, of the second tractor feeder unit 64 and it is determined that the delivery has succeeded, the operation proceeds to the aforementioned ordinary operation as it is. On the other hand, if the IC tag continuous body 1 is not detected by the sheet detection sensor, not shown, of the second tractor feeder unit 64 and it is determined that the delivery has failed (the feed pins 64e were not well engaged with the sprocket holes 11 of the IC tag continuous body 1), the conveyance control unit 101 performs a retry operation. The retry operation is to reverse the conveyance directions of the first conveyance unit 62 and the second conveyance unit 63 so as to return the tip end of the IC tag continuous body 1 to above the second conveyance unit 63 and also to execute the initialization processing of the second tractor feeder unit 64 and to return the conveyance directions of the first conveyance unit 62 and the second conveyance unit 63 to forward rotation so as to feed the IC tag continuous body 1 to the second tractor feeder unit 64. The number of times of performance of the retry operation is set in advance. If the delivery of the IC tag continuous body 1 does not succeed even after the preset number of times of performance of the retry operation, the conveyance control unit 101 determines it to be jamming (paper jam) and executes a jamming processing operation such as stop of the operation of the device or reversal of the conveyance directions of the first conveyance unit 62 and the second conveyance unit 63 so as to return the IC tag continuous body 1 to the placing base 2.

FIG. 16(*b*) is an explanatory view for explaining a control method of the suction force when a "thin sheet" such as a label or the like is used as the sheet information of the IC tag continuous body 1. If the "thin sheet" is used as the sheet information, when the IC tag continuous body 1 is set on the first tractor feeder unit 61 and the start button, not shown, is pressed down, the conveyance control unit 101 controls the suction constituent element group and controls the suction forces of the first negative pressure suction unit 71 and the second negative pressure suction unit 72 in the first conveyance unit 62 and the third negative pressure suction unit 73 and the fourth negative pressure suction unit 74 in the second conveyance unit 63 to "10" which is the maximum. This state is continued until the detection mark 12 of the IC tag continuous body 1 is detected by the third sensor 83 and the IC tag continuous body 1 is delivered from the second conveyance unit 63 to the printing device 4. If the IC tag continuous body 1 is the "thin sheet" such as a label or the like, meandering or skewing of the IC tag continuous body 1 and rising of the tip end of the IC tag continuous body 1 can easily occur and thus, the state of being suctioned to the first conveyance unit 62 and the second conveyance unit 63 by a strong suction force is continued until the IC tag continuous body 1 reaches the printing device 4 and the conveyance is switched to the subsequent conveyance based on the second tractor feeder unit 64.

In this embodiment, the suction forces of the sixth negative pressure suction unit 76 and the seventh negative pressure suction unit 77 in the fourth conveyance unit 67 of the post-processing device 5 are controlled to "5" at all times. Moreover, the suction forces of the first negative pressure suction unit 71, the second negative pressure suction unit 72, the third negative pressure suction unit 73, the fourth negative pressure suction unit 74, the sixth negative pressure suction unit 76, and the seventh negative pressure suction unit 77 or timing of switching the suction force may be configured settable manually.

Moreover, this embodiment is configured such that the sheet information of the IC tag continuous body 1 is set in accordance with the thickness of the sheet and suction force is controlled until the tip end of the IC tag continuous body 1 reaches the printing device 4 but it may be so configured that the width of the IC tag continuous body 1 is set as the sheet information and the suction force is controlled until the tip end of the IC tag continuous body 1 reaches the printing device 4. In this case, it is desirably controlled such that the smaller the width of the IC tag continuous body 1 is, that is, the smaller the area is, the stronger the suction force becomes.

As described above, according to this embodiment, the IC tag issuing apparatus includes the pre-processing device 3 for writing the identification data in the IC tags 10 in multiple rows aligned as the IC tag continuous body 1, the printing device 4 for printing the print data on the IC tag 10 in which the identification data has been written, and the post-processing device 5 for reading and verifying the identification data written to the IC tag 10, including the first conveyance unit 62 and the second conveyance unit 63 functioning as the pre-processing conveyance units provided in the pre-processing device 3 and conveying the IC tag continuous body 1 by suctioning it to the conveyance belts 62c and 63c, the second tractor feeder unit 64 functioning as the print-processing tractor feeder unit provided in the printing device 4 and conveying the IC tag continuous body 1 by engaging and disengaging feed pins 64e in sprocket holes 11 formed in the IC tag continuous body 1, and the fourth conveyance unit 67 functioning as the post-processing conveyance unit provided in the post-processing device 5 and conveying the IC tag continuous body 1 by suctioning it to the conveyance belt 67c. By means of this constitution, the IC tag continuous body 1 is conveyed on the basis of the second tractor feeder unit 64 of the printing device 4, and the IC tag continuous body 1 is brought into a state in close contact with the conveyance belts 62c, 63c, and 67c through a negative pressure by the first conveyance unit 62 and the second conveyance unit 63 of the pre-processing device 3 on the upstream side and the fourth conveyance unit 67 of the post-processing device 5 on the downstream side, while an appropriate tension can be given to the conveyance direction. As a result, defective data writing, defecting printing, and defective data reading caused by meandering, skewing or rising of the IC tag continuous body 1 can be prevented.

Moreover, according to this embodiment, the conveyance speed of the first conveyance unit 62 and the second conveyance unit 63 is set slower than the conveyance speed of the second tractor feeder unit 64, and the conveyance speed of the fourth conveyance unit 67 is set faster than the conveyance speed of the second tractor feeder unit 64. By means of this constitution, in an ordinary conveyance operation, in the first conveyance unit 62 and the second conveyance unit 63 of the pre-processing device 3, the speed at which the IC tag continuous body 1 is conveyed is faster than rotational moving speeds of the conveyance belts 62c and 63c of the first conveyance unit 62 and the second conveyance unit 63 and thus, the IC tag continuous body 1 is pulled to the downstream side in the conveyance direction and is conveyed while slightly sliding on the conveyance belts 62c and 63c, whereby an appropriate tension toward a front in the conveyance direction can be given to the IC tag continuous body 1. Moreover, in the fourth conveyance unit 67 of the post-processing device 5, since the speed at which the IC tag continuous body 1 is conveyed is slower than the rotational moving speed of the conveyance belt 67c of the fourth conveyance unit 67, the IC tag continuous body 1 is pulled to the upstream side in the conveyance direction and is conveyed while slightly sliding on the conveyance belt 67c, whereby an appropriate tension toward a rear in the conveyance direction can be given to the IC tag continuous body 1.

Moreover, according to this embodiment, the second antenna unit 32 and the third antenna unit 33 arranged by facing the first conveyance unit 62 and the second conveyance unit 63 and writing the identification data in the IC tag 10 and the fourth antenna unit 51 arranged by facing the fourth conveyance unit 67 and reading the identification data written to the IC tag 10 are provided. By means of this constitution, communication can be conducted in a state in which the IC tags 10 of the IC tag continuous body 1 being conveyed are reliably faced with the second antenna unit 32, the third antenna unit 33, and the fourth antenna unit 51, whereby communication accuracy can be improved.

Moreover, according to this embodiment, the first tractor feeder unit 61 provided on the upstream side from the first conveyance unit 62 of the pre-processing device 3 and conveying the IC tag continuous body 1 by engaging and disengaging the feed pins 61e in the sprocket holes 11 formed in the IC tag continuous body 1, and the first rotary encoder unit 91 functioning as the rotation angle detecting means provided on the driving shaft of the first tractor feeder unit 61 are provided, and the first tractor feeder unit 61 stops driving before the IC tag continuous body 1 reaches the second tractor feeder unit 64 after the IC tag continuous body 1 is conveyed to the first conveyance unit 62. By means of this constitution, the set IC tag continuous body 1 can be reliably conveyed to the first conveyance unit 62. Moreover, since the first tractor feeder unit 61 stops driving before the IC tag continuous body 1 reaches the printing device 4, there is no need of synchronization with the ordinary conveyance operation based on the conveyance by the second tractor feeder unit 64, whereby control can be simplified.

Moreover, according to this embodiment, the respective conveyance belts 62c, 63c, and 67c of the first conveyance unit 62, the second conveyance unit 63, and the fourth conveyance unit 67 are constituted by urethane belts, and the support plates 62e, 63e, and 67e supporting the conveyance belts 62c, 63c, and 67c, respectively, are constituted by POM (polyacetal resin) plates. By means of this constitution, abrasion caused by sliding between the conveyance belts 62c, 63c, and 67c as well as the support plates 62e, 63e, and 67e can be suppressed. Moreover, by constituting the conveyance belts 62c, 63c, and 67c and the support plates 62e, 63e, and 67e by a material with excellent friction resistance (material with low friction factor), electric charge can be prevented, and breakage of the IC tag 10 (IC chip 15) by electric discharge can be prevented.

The present invention has been described by using the specific embodiment but the aforementioned embodiment is an example, and it is needless to say that it can be changed and put into practice within a range not departing from the gist of the present invention.

REFERENCE SIGNS LIST

1 IC tag continuous body
2 placing base
3 pre-processing device
4 printing device
5 post-processing device
10 IC tag
11 sprocket hole
12 detection mark
13 inlay
13a base material
14 antenna
14a loop-shaped antenna element
14b dipole antenna element
14c meander line antenna element
15 IC chip
21 placing plate
31 first antenna unit
31a to 31j row antenna unit
32 second antenna unit
32a to 32j row antenna unit
33 third antenna unit
41 print unit
42 optical fixation unit
43 filter unit
51 fourth antenna unit
52 emboss processing unit
53 cutter member
61 first tractor feeder unit
61a driving roller
61b driven roller
61c endless belt
61d first tractor feeder driving motor
61e feed pin
62 first conveyance unit
62a driving roller
62b driven roller
62c conveyance belt
62d first conveyance belt driving motor
62e support plate
62f through hole
63 second conveyance unit
63a driving roller
63b driven roller
63c conveyance belt
63d second conveyance belt driving motor
63e support plate
63f through hole
64 second tractor feeder unit
64a driving roller
64b driven roller
64c endless belt
64d second tractor feeder driving motor
64e feed pin
65 third conveyance unit
65a driving roller
65b driven roller
65c conveyance belt
65d third conveyance belt driving motor
65e support plate
66 discharge roller
67 fourth conveyance unit
67a driving roller
67b driven roller
67c conveyance belt
67d fourth conveyance belt driving motor
67e support plate
71 first negative pressure suction unit
71a first suction fan
71b suction hole
72 second negative pressure suction unit
72a second suction fan
72b suction hole
73 third negative pressure suction unit
73a third suction fan
73b suction hole
74 fourth negative pressure suction unit
74a fourth suction fan
74b suction hole
75 fifth negative pressure suction unit
75a fifth suction fan
76 sixth negative pressure suction unit
76a sixth suction fan
77 seventh negative pressure suction unit
77a seventh suction fan
81 first sensor
82 second sensor
83 third sensor
84 fourth sensor
85 fifth sensor
86 sixth sensor
87 seventh sensor
91 first rotary encoder unit
92 second rotary encoder unit
93 page-number reading unit
101 conveyance control unit
102 writing control unit
103 print control unit
110 information storage unit
111 product information storage portion
112 page information storage portion
113 reissuance information storage portion
121 tag ID reading unit
122 first identification data writing unit
123 second identification data writing unit
124 identification data reading unit
310 shield plate
311a to 311j opening portion
312 printed board
313 loop-shaped antenna element
314 antenna terminal
315 ferrite sheet
316 antenna case
316a opening for terminal
317 screw
318 non-adhesive coating sheet

The invention claimed is:
1. An IC tag issuing method, comprising:
pre-processing including:
conveying an IC tag continuous body on a pre-processing conveyor belt in a conveyance direction, the IC tag continuous body including a plurality of IC tags,
writing identification data to the IC tags of the IC tag continuous body, and suctioning the IC tag continuous body to maintain close contact between the IC tag continuous body and the pre-processing conveyor belt during the pre-processing; and post-processing including:
conveying the IC tag continuous body on a post-processing conveyor belt in a conveyance direction,
reading and verifying the identification data written to the IC tags of the IC tag continuous body, and
suctioning the IC tag continuous body to maintain close contact between the IC tag continuous body and the post-processing conveyor belt during the post-processing.

2. The IC tag issuing method according to claim 1, wherein:
the IC tag continuous body includes IC tags aligned in multiple rows in a width direction orthogonal to the conveyance direction.

3. The IC tag issuing method according to claim 1, further comprising:
printing of printing print data on the IC tags to which the identification data has been written.

4. The IC tag issuing method according to claim 3, wherein,
the printing includes conveying the IC tag continuous body by engaging and disengaging feed pins in sprocket holes formed in the IC tag continuous body.

5. The IC tag issuing method according to claim 3, further comprising:
setting a conveyance speed of the pre-processing such that the conveyance speed of the pre-processing is slower than a conveyance speed of the printing; and
setting a conveyance speed of the post-processing such that the conveyance speed of the post-processing is faster than the conveyance speed of the printing.

6. The IC tag issuing method according to claim 3, wherein the printing is carried out in a non-contact manner with respect to the IC tags.

7. The IC tag issuing method according to claim 6, wherein the printing comprises melting toner by irradiating flash light on a surface of the IC tags.

8. The IC tag issuing method according to claim 3, wherein the printing comprises an inkjet method.

9. The IC tag issuing method according to claim 1, wherein the writing identification data to the IC tags of the IC tag continuous body occurs while conveying the IC tag continuous body on the pre-processing conveyor belt.

10. An IC tag issuing method, comprising:
pre-processing including:
conveying an IC tag continuous body on a pre-processing conveyor in a conveyance direction, the IC tag continuous body including a plurality of IC tags,
writing identification data to the IC tags of the IC tag continuous body, and
suctioning the IC tag continuous body to maintain close contact between the IC tag continuous body and the pre-processing conveyor during the pre-processing;
post-processing including:
conveying the IC tag continuous body on a post-processing conveyor in a conveyance direction,
reading and verifying the identification data written to the IC tags of the IC tag continuous body, and
suctioning the IC tag continuous body to maintain close contact between the IC tag continuous body and the post-processing conveyor during the post-processing; and setting a conveyance speed of the post-processing such that the conveyance speed of the post-processing is faster than a conveyance speed of the pre-processing.

11. The IC tag issuing method according to claim 10, further comprising:
printing of print data on the IC tags to which the identification data has been written, the printing being executed between the pre-processing and the post-processing.

12. The IC tag issuing method according to claim 11, further comprising:
setting a conveyance speed of the pre-processing such that the conveyance speed of the pre-processing is slower than a conveyance speed of the printing; and
setting a conveyance speed of the post-processing such that the conveyance speed of the post-processing is faster than the conveyance speed of the printing.

13. The IC tag issuing method according to claim 11, wherein the printing is carried out in a non-contact manner with respect to the IC tags.

14. The IC tag issuing method according to claim 13, wherein the printing comprises melting toner by irradiating flash light on a surface of the IC tags.

15. The IC tag issuing method according to claim 11, wherein the printing comprises an inkjet method.

16. An IC tag issuing apparatus, comprising:
a pre-processor configured to convey an IC tag continuous body including IC tags on a pre-processing conveyor belt in a conveyance direction, and to write identification data to the IC tags of the IC tag continuous body; and
a post-processor configured to convey the IC tag continuous body on a post-processing conveyor belt in a conveyance direction, and to read and verify the identification data written to the IC tags of the IC tag continuous body, wherein
the pre-processor includes at least one suction configured to apply suction to the IC tag continuous body to maintain close contact between the IC tag continuous body and the pre-processing conveyor belt in the pre-processor, and
the post-processor includes at least one suction configured to apply suction to the IC tag continuous body to maintain close contact between the IC tag continuous body and the post-processing conveyor belt in the post-processor.

17. The IC tag issuing apparatus according to claim 16, wherein:
the IC tag continuous body includes IC tags aligned in multiple rows in a width direction orthogonal to the conveyance direction.

18. The IC tag issuing apparatus according to claim 16, wherein:
a conveyance speed of the post-processor is set faster than a conveyance speed of the pre-processor.

19. The IC tag issuing apparatus according to claim 16, further comprising:
a printer configured to print print data on the IC tags to which the identification data has been written.

20. The IC tag issuing apparatus according to claim 19, wherein:
the printer includes a print-processing tractor feeder configured to convey the IC tag continuous body by engaging and disengaging feed pins in sprocket holes formed in the IC tag continuous body.

21. The IC tag issuing apparatus according to claim 20, wherein:

a conveyance speed of the pre-processing conveyor belt is set slower than a conveyance speed of the print-processing tractor feeder; and a conveyance speed of the post-processing conveyor belt is set faster than the conveyance speed of the print-processing tractor feeder.

22. The IC tag issuing apparatus according to claim 19, wherein:

the printer includes a printer conveyor configured to convey the IC tag continuous body from the printer to the post-processor in the conveyance direction, and at least one suction configured to apply suction to the IC tag continuous body to maintain close contact between the IC tag continuous body and the printer conveyor in the printer.

23. The IC tag issuing apparatus according to claim 19, wherein the printer is configured to print in a non-contact manner with respect to the IC tags.

24. The IC tag issuing apparatus according to claim 23, wherein the printer is configured to print by melting toner by irradiating flash light on a surface of the IC tags.

25. The IC tag issuing apparatus according to claim 19, wherein the printer is configured to print via an inkjet method.

26. The IC tag issuing apparatus according to claim 16, further comprising:

a pre-processing antenna arranged to face the pre-processing conveyor belt and configured to write the identification data to the IC tags; and a post-processing antenna arranged to face the post-processing conveyor belt and configured to read the identification data written to the IC tags.

27. The IC tag issuing apparatus according to claim 16, further comprising:

a pre-processing tractor feeder provided on an upstream side from the pre-processing conveyor belt of the pre-processor and configured to convey the IC tag continuous body by engaging and disengaging feed pins in the sprocket holes formed in the IC tag continuous body; and a rotation angle detector provided on a driving shaft of the pre-processing tractor feeder, wherein the pre-processing tractor feeder is configured to stop driving before the IC tag continuous body reaches a print-processing tractor feeder after the IC tag continuous body is conveyed to the pre-processing conveyor belt.

28. The IC tag issuing apparatus according to claim 16, wherein:

the pre-processing conveyor belt and the post-processing conveyor belt comprise urethane belts supported by POM (polyacetal resin) support plates.

29. The IC tag issuing apparatus according to claim 28, wherein:

each of the support plates includes a plurality of suction holes therein, the at least one suction of the pre-processor is a negative pressure suction configured to suction air through the plurality of suction holes of a support plate provided in the pre-processing conveyor belt, and the at least one suction of the post-processor is a negative pressure suction configured to suction air through the plurality of suction holes of a support plate provided in the post-processing conveyor belt.

30. The IC tag issuing apparatus according to claim 29, wherein:

the at least one suction of the pre-processor includes a first fan, and the at least one suction of the post-processor includes a second fan.

31. The IC tag issuing apparatus according to claim 16, wherein the pre-processor is configured to write identification data to the IC tags of the IC tag continuous body occurs while conveying the IC tag continuous body on the pre-processing conveyor belt.

\* \* \* \* \*